(12) United States Patent
Matsuura et al.

(10) Patent No.: US 7,452,946 B2
(45) Date of Patent: Nov. 18, 2008

(54) ETHYLENE POLYMER

(75) Inventors: Sadahiko Matsuura, Sodegaura (JP);
Naoto Matsukawa, Sodegaura (JP);
Makoto Mitani, Sodegaura (JP); Junji Saito, Sodegaura (JP); Terunori Fujita, Sodegaura (JP); Yasushi Tohi, Sodegaura (JP); Koji Endo, Sodegaura (JP); Kenji Iwamasa, Ichihara (JP); Keiko Takahashi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 90 days.

(21) Appl. No.: 10/553,726

(22) PCT Filed: May 19, 2004

(86) PCT No.: PCT/JP2004/007124

§ 371 (c)(1),
(2), (4) Date: Oct. 19, 2005

(87) PCT Pub. No.: WO2004/104055

PCT Pub. Date: Dec. 2, 2004

(65) Prior Publication Data

US 2006/0199925 A1     Sep. 7, 2006

(30) Foreign Application Priority Data

May 20, 2003     (JP)     ............... 2003-141246

(51) Int. Cl.
*C08F 4/6592*     (2006.01)
*C08F 4/642*     (2006.01)
*C08F 4/645*     (2006.01)
*C08F 210/16*     (2006.01)

(52) U.S. Cl. .................. 526/114; 526/113; 526/118; 526/119; 526/160; 526/161; 526/172; 525/240

(58) Field of Classification Search .................. 526/113, 526/114, 118, 119, 160, 161, 172; 525/240
See application file for complete search history.

(56) References Cited

U.S. PATENT DOCUMENTS

| 6,054,542 | A | | 4/2000 | Kojoh et al. |
| 6,063,871 | A | * | 5/2000 | Kishine et al. ............... 525/240 |
| 7,205,358 | B2 | * | 4/2007 | Mitsuno ............... 525/191 |
| 2002/0055600 | A1 | | 5/2002 | Fujita et al. |
| 2003/0120003 | A1 | | 6/2003 | Kashiwa et al. |

FOREIGN PATENT DOCUMENTS

| EP | 0 783 022 A1 | 7/1997 |
| EP | 0 874 005 A1 | 10/1998 |
| EP | 0 926 169 A2 | 6/1999 |
| EP | 1 300 425 A2 | 4/2003 |
| EP | 1 548 018 A1 | 6/2005 |
| JP | 7-278221 A | 10/1995 |
| JP | 11-315109 A | 11/1999 |
| JP | 2002-105132 A | 4/2002 |
| JP | 2002-212217 A | 7/2002 |
| JP | 2002-275332 A | 9/2002 |
| JP | 2002-275342 A | 9/2002 |
| JP | 2003-20306 A | 1/2003 |
| WO | WO-96/23010 A2 | 8/1996 |
| WO | WO-02/08306 A1 | 1/2002 |
| WO | WO-2004/029062 A1 | 4/2004 |

* cited by examiner

*Primary Examiner*—Roberto Rábago
(74) *Attorney, Agent, or Firm*—Birch, Stewart, Kolasch & Birch, LLP

(57) ABSTRACT

An ethylene-based polymer which is a copolymer obtained from ethylene and a C3 to C10α-olefin and satisfies the following requirements (i), (ii), (iii) and (iv) simultaneously provides a blow-molded product and an extrusion-molded product excellent in moldability, mechanical strength and outward appearance.

(i) melt flow rate [$MFR_2$ (g/10 min)] under a loading of 2.16 kg at 190° C. is in the range of 0.01 to 10,
(ii) melt tension [MT (g)] and the above melt flow rate [$MFR_2$ (g/10 min)] satisfy the following relationship: $MT \geq 3.2 \times MFR_2^{-0.55}$,
(iii) an activation energy [Ea] of fluidization is less than 30 (KJ/mol), and
(iv) swell ratio is 1.36 or more.

The ethylene-based polymer of the invention is preferably produced by copolymerizing ethylene with a C3 to C10 α-olefin, in the presence of a solid catalyst carrying, on (C) a solid carrier, a mixed transition metal compound consisting of (A1) a group 4 transition metal compound containing a specific salicyl aldimine ligand and (A2) a group 4 transition metal compound containing a specific cyclopentadienyl ligand and (B) at least one compound selected from (b-1) an organometallic compound, (b-2) an organoaluminum oxy compound, and (b-3) a compound reacting with the transition metal compound to form an ion pair.

5 Claims, 1 Drawing Sheet

ETHYLENE POLYMER

TECHNICAL FIELD

The present invention relates to a novel ethylene-based polymer, a polymerization catalyst and a polymerization method for producing the ethylene-based polymer, and use of the ethylene-based polymer. Specifically, the present invention relates to (1) an ethylene-based polymer satisfying specific properties, (2) a method of producing the ethylene-based polymer by using a polymerization catalyst carrying, on a solid carrier, at least one transition metal compound containing a salicyl aldimine ligand and at least one transition metal compound containing a cyclopentadienyl ligand, and at least one compound selected from an organometallic compound, an organoaluminum oxy compound, and a compound reacting with the transition metal compound to form an ion pair, and (3) use of the ethylene-based polymer in blow-molded products, pipes etc.

BACKGROUND ART

Polyolefins such as polyethylene and polypropylene are clean materials consisting of carbon and hydrogen not detriment to the environment, and are excellent in processing moldability and physical properties. Because of these characteristics, these materials have been used in a wide variety of fields in automobiles, electric instrument parts, food packages, drink/cosmetic/medical containers, civil engineering materials, and agricultural materials etc. In recent years, however, there are various demands for physical properties of polyolefin, and polyolefin having various characteristics are desired. Further improvement in productivity is also desired. Particularly when blow molding or sheet molding is conducted, melt tension (hereinafter abbreviated sometimes as MT) and swell ratio are desired to be high.

As ethylene-based polymers excellent in these physical properties, polyethylene produced by a high-pressure process and polyethylene obtained by a Cr-based Philips type catalyst are known, but there is a large amount of long chains and branched chains therein, and thus rigidity and impact strength are lowered. Further, regulation of the amount of long chains and branched chains and introduction of α-olefin comonomers are difficult, so there is limit to physical properties which can be attained. Further, such high-pressure polyethylene has the problem of high fluidization activating energy as a measure of temperature dependence for generating resin fluidization at the time of molding.

Conventionally, a Zeigler type titanium-based catalyst comprising a titanium-based compound and an organoaluminum compound is well known as a polymerization catalyst for producing an ethylene polymer and an ethylene-based polymer such as an ethylene/α-olefin copolymer. In recent years, a metallocene-based catalyst comprising a metallocene compound having a cyclopentadienyl group and an organoaluminum oxy compound (aluminoxane) comes to be known as a catalyst by which an olefin polymer can be produced with a high polymerization activity, and recently, a novel catalyst system comprising a transition metal compound having a ligand of diimine structure has also been proposed (see WO96/23010A2). Recently, a metallocene compound having a cyclopentadienyl group preferable as a catalyst for producing an ethylene-based polymer with narrow compositional distribution has also been proposed as a novel olefin polymerization catalyst by the present applicant in WO2004/029062A1. Further, the present applicant has also proposed, in Japanese Patent Application Laid-Open No. 11-3151.09 and EP0874005A1, a transition metal compound containing a salicyl aldimine ligand. The transition metal compound containing a salicyl aldimine ligand is characterized in that it is easily synthesized, has a high ethylene polymerization performance, and can regulate polymerization performance such as molecular weight, copolymerizability etc. by changing the structure of the ligand.

Ethylene-based polymers obtained by using these polymerization catalysts are excellent in rigidity and impact strength as compared with the above-mentioned high-pressure process polyethylene or Cr-based catalyst product, but cannot be said to be satisfactory in respect of MT and swell ratio, so there is room for improvement.

Some proposes have been made to solve these problems for the above-mentioned catalysts. For example, Japanese Patent Application Laid-Open No. 7-278221 describes that an ethylene-based polymer excellent in MT and swell ratio is obtained by combination of a specific Ti compound, a liquid Mg compound and a compound having an ether linkage. In this case, however, the swell ratio is 1.35 or less, which cannot be said to be sufficiently high. The present inventors have disclosed a process for producing a long-chain and branched chain-containing polyolefin by using a combination of specific transition metal compounds in Japanese Patent Application Laid-Open No. 2002-105132. In this case, however, the activation energy of fluidization is increased by introduction of long chains and branched chains, but the effect on improvement of MT is low.

In view of the process for production of polyolefin including the polyethylene-based polymer, high-density polyethylene has been produced generally by slurry polymerization, generally in a low-pressure process using a Ziegler type catalyst. When high-density polyethylene having an arbitrary molecular-weight distribution, among the above high-density polyethylenes, is produced for the purpose of regulating moldability and physical properties, the polymerization is conducted in multistage, and usually the molecular weight and density of a polymer formed in each stage is regulated in the polymerization. Specifically, the polymerization is constituted of a multistage slurry polymerization process consisting of a low-molecular-weight polyethylene polymerization step and a high-molecular-weight polyethylene polymerization step, but in such multistage process, there remain problems to be solved with respect to the process and cost because of troublesome operation due to the multistage process and necessity for use of a large amount of hydrogen in the process of formation of low-molecular-weight polyethylene.

The present inventors made extensive studies for improvement of melt tension and rationalization of the process for polyolefin by the multistage polymerization method, and as a result, they found polyolefin exhibiting excellent melt tension and low activation energy of fluidization and overcoming the problems of the conventional resin by regulating the length and amount of long chains and branched chains by using a specific olefin polymerization catalyst.

DISCLOSURE OF INVENTION

The ethylene-based polymer of the present invention is a copolymer obtained from ethylene and a C3 to C10 α-olefin and satisfying the following requirements (i), (ii), (iii) and (iv) simultaneously:

(i) melt flow rate [$MFR_2$ (g/10 min)] under a loading of 2.16 kg. at 190° C. is in the range of 0.01 to 10, (ii) melt tension [MT (g)] and the above melt flow rate [MFR$_2$ (g/10 min)] satisfy the following relationship:

$$MT \geq 3.2 \times MFR_2^{-0.55}$$

(iii) the activation energy [Ea] of fluidization is less than 30 (KJ/mol), and
(iv) swell ratio is 1.36 or more.

The ethylene-based polymer of the present invention is preferably obtained by copolymerizing ethylene with a C3 to C10 α-olefin, in the presence of a solid catalyst component carrying on (C) a solid carrier:
(A1) a group 4 transition metal compound represented by the general formula [I] below,
(A2) a group 4 transition metal compound represented by the general formula [II] below, and
(B) at least one compound selected from:
 (b-1) an organometallic compound,
 (b-2) an organoaluminum oxy compound, and.
 (b-3) a compound reacting with the transition metal compound (A1) or (A2) to form an ion pair,

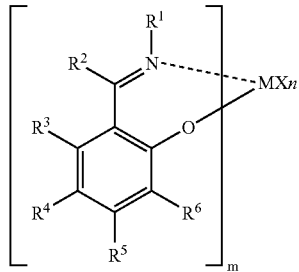

[I]

where the meanings of various symbols will be described in detail in "Best Mode for Carrying Out the Invention" described later.

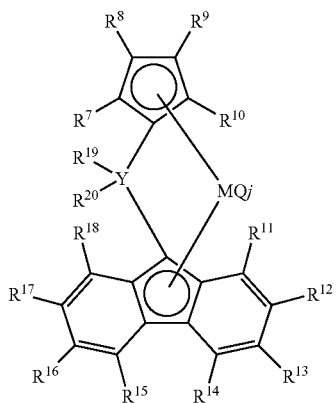

[II]

where the meanings of various symbols will be described in detail in "Best Mode for Carrying Out the Invention" described later.

Further, the present invention relates to a blow-molded product comprising the ethylene-based polymer described above. The ethylene-based polymer is applied preferably to a blow-molded product, particularly an oil drum, a large container, a large gasoline tank, a large industrial chemical can or a large bottle container.

Further, the present invention relates to a pipe or a pipe joint comprising the ethylene-based polymer described above.

BEST MODE FOR CARRYING OUT THE INVENTION

Figure 1:
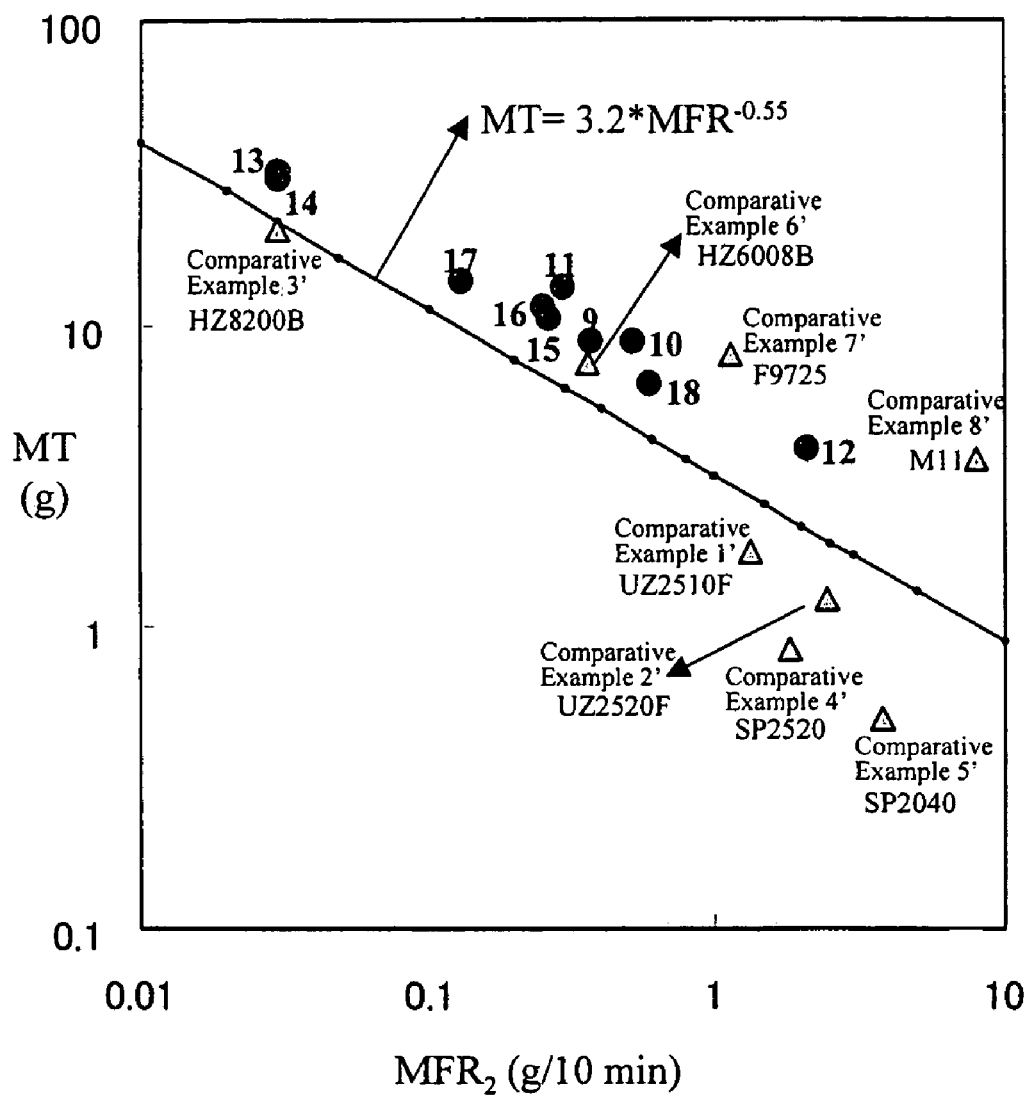
FIG. 1 is a graph in which melt tension and MFR$_2$ values of ethylene-based polymers obtained in the Examples and Comparative Examples are plotted.

Hereinafter, the ethylene-based polymer of the present invention and applications thereof are specifically described.

The ethylene-based polymer of the present invention is a copolymer obtained from ethylene and a C3 to C10 α-olefin and satisfying the following requirements (i), (ii), (iii) and (iv) simultaneously:
(i) melt flow rate [MFR$_2$ (g/10 min)] under a loading of 2.16 kg at 190° C. is in the range of 0.01 to 10,
(ii) melt tension [MT (g)] and the above melt flow rate [MFR$_2$ (g/10 min)] satisfy the following inequation:

$$MT \geq 3.2 \times MFR_2^{-0.55} \quad (Eq-1)$$

(iii) the activation energy [Ea] of fluidization is less than 30 (KJ/mol), and
(iv) swell ratio is 1.36 or more.

The ethylene-based polymer of the present invention is an ethylene homopolymer or a copolymer obtained from ethylene and a C3 to C10 α-olefin; that is, the ethylene-based polymer contains an ethylene-derived structural unit as an essential component and further contains a C3 to C10 α-olefin-derived structural unit. The C3 to C10 α-olefin may be one kind of olefin or two or more different kinds of olefins. The C3 to C10α-olefin (hereinafter referred to sometimes as "α-olefin") includes, for example, propylene, 1-butene, 1-pentene, 3-methyl-1-butene, 1-hexene, 4-methyl-1-pentene, 3-methyl-1-pentene, 1-octene and 1-decene. In the present invention, the ethylene-based polymer preferably contains a structural unit derived from at least one member selected from 1-hexene, 4-methyl-1-pentene and 1-octene, more preferably a structural unit derived from 1-hexene. The ethylene-based polymer of the present invention is an ethylene-based polymer in which the C3 to C10 α-olefin-derived structural unit is contained in an amount of usually 0 to 5.0 mol %, preferably 0.05 to 1.0 mol %, more preferably 0.1 to 0.5 mol %.

The ethylene-based polymer of the present invention is characterized in simultaneously satisfying the requirements (i), (ii), (iii) and (iv) described above. Hereinafter, each requirement is described in detail.

Requirement (i)

The melt flow rate [MFR$_2$ (g/10 min)] of the ethylene-based polymer of the present invention under a loading of 2.16 kg at 190° C. is in the range of 0.01 to 10. The melt flow rate [MFR$_2$ (g/10min)] is preferably in the range of 0.01 to 5, more preferably in the range of 0.1 to 5.

Requirement (ii)

One feature of the ethylene-based polymer of the present invention is that in the above-defined range of melt flow rate [MFR$_2$ (g/10 min)] under a loading of 2.16 kg, this melt flow rate and melt tension [MT (g)] satisfy the following inequation (Eq-1). The following inequation (Eq-2) is preferably satisfied, and the following inequation (Eq-3) is more preferably satisfied.

$$MT \geq 3.2 \times MFR_2^{-0.55} \quad \text{(Eq-1)}$$

$$12.0 \times MFR_2^{-0.55} \geq MT \geq 3.2 \times MFR_2^{-0.55} \quad \text{(Eq-2)}$$

$$8.0 \times MFR_2^{-0.55} \geq MT \geq 3.6 \times MFR_2^{-0.55} \quad \text{(Eq-3)}$$

Requirement (iii)

The fluidization activation energy [Ea] of the ethylene-based polymer of the present invention is less than 30 (KJ/mol), preferably 10 to 28 (KJ/mol), more preferably 20 to 28 (KJ/mol). When Ea is in this range, the ethylene-based polymer is advantageous in that it is excellent in fluidity.

Requirement (iv)

The swell ratio of the ethylene-based polymer of the present invention is 1.36 or more, preferably 1.40 or more. When the swell ratio is in this range, a product having uniform thickness with less distribution of thickness can be obtained by blow molding.

The ethylene-based polymer of the present invention preferably satisfies the following requirements (v) to (vii) in addition to the requirements (i) to (iv) described above.

Requirement (v)

The density of the ethylene-based polymer of the present invention is in the range of 910 to 970 (kg/m$^3$), preferably 920 to 970 (kg/m$^3$), more preferably 930 to 970 (kg/m$^3$)

Requirement (vi)

The intrinsic viscosity [η] of the ethylene-based polymer of the present invention is in the range of 1.0 to 5.0 (dl/g), preferably 1.5 to 3.0 (dl/g).

Requirement (vii)

The intrinsic viscosity ([η] (dl/g)) and melt flow rate at 190° C. under a loading of 21.6 kg [MFR$_{20}$ (g/10 min)] of the ethylene-based polymer of the present invention satisfy the following inequation (Eq-4), preferably the following inequation (Eq-5):

$$[\eta] \leq -1.3 \log (MFR_{20}) + 4.35 \quad \text{(Eq-4)}$$

$$-1.3 \log (MFR_{20}) + 3.50 \leq [\eta] \leq -1.3 \log (MFR_{20}) + 4.35 \quad \text{(Eq-5)}$$

The melt flow rate [MFR$_{20}$(g/10 min)] at 190° C. under a loading of 21.6 kg is usually in the range of 1 to 100 (g/10 min), preferably 1 to 50 (g/10 min), more preferably 2 to 30 (g/10 min).

The ethylene-based polymer of the present invention satisfying the above requirements (i) to (iv) and the parameter ranges prescribed preferably in the above requirements (v) to (vii) can be produced arbitrarily as desired by using the production conditions in the Examples in this patent application, or by making a minor change in condition factors, or by blending such resins. The ethylene-based polymer of the present invention can be produced as desired, specifically by changing condition factors such as structures of the transition metal compounds [I] and [II] used, the carrying ratio, requirements for the catalyst component such as the type of a carrier and a co-catalyst component, as well as polymerization conditions such as polymerization temperature, the amount of a molecular weight regulator such as coexistent hydrogen, and the amount of a comonomer added. Further, the range of physical properties can be enlarged by combination with multistage polymerization.

More specifically, the amount of a long chain and branched chain which can be introduced into the polymer can be increased by lowering the polymerization temperature, by increasing the amount of comonomers added, or by changing the structure of the transition metal compound [I] used, etc., and in this case, the value of MT tends to be increased relatively to the value of MFR, while the value of [η] tends to be decreased relatively to the value of MFR. The activation energy (Ea) of fluidization can be regulated by changing a combination of the transition metal catalysts. Particularly, when the transition metal catalysts are a combination of a transition metal compound having the structure of [I] and a 4 group transition metal compound containing 2 cyclopentadienyl skeletons as the ligand wherein the 2 cyclopentadienyl skeletons are bound to each other via the group 4 atom, Ea can be regulated to 30 KJ/mol or more.

The ethylene-based polymer of the present invention is obtained by copolymerizing ethylene with the above-mentioned C3 to C10 α-olefin, in the presence of a polymerization catalyst carrying on (C) a solid carrier:

(A1) a group 4 transition metal compound represented by the general formula [I] below, (A2) a group 4 transition metal compound represented by the general formula [II] below, and (B) at least one compound selected from:
 (b-1) an organometallic compound,
 (b-2) an organoaluminum oxy compound, and
 (b-3) a compound reacting with the transition metal compound (A1) or (A2) to form an ion pair.

Hereinafter, the respective constituent components of the polymerization catalyst according to the present invention are described in detail.

(A1) Group 4 transition metal compound represented by the general formula [I] below

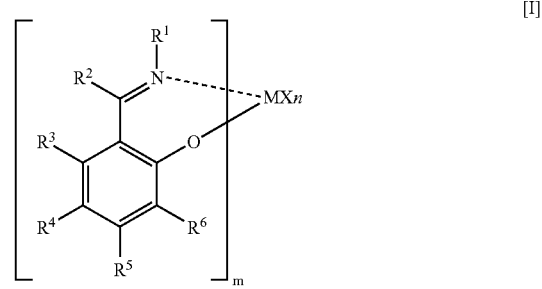

where N . . . M generally shows that the two elements are coordinated, but in the present invention, they may or may not be coordinated.

In the general formula [I], M represents a transition metal atom in the group 4 in the periodic table, and is specifically titanium, zirconium or hafnium, preferably zirconium.

m is an integer of 1 to 4, preferably 2, and n is a number. satisfying the valence of M, and R$^1$ to R$^6$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of these groups may be bound to one another to form a ring.

When m is 2 or more, two of the groups represented by R$^1$ to R$^6$ may be bound to each other provided that R$^1$s shall not be bound to each other.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n, is 2 or more, a plurality of groups represented by X's may be the same or different, and a plurality of groups represented by X's may be bound to one another to form a ring, Hereinafter, $R^1$ to $R^6$ are specifically described.

The halogen atom includes fluorine, chlorine, bromine and iodine.

Specific examples of the hydrocarbon group include a C1 to C30, preferably C1 to C20, linear or branched alkyl group such as a methyl group, ethyl group, n-propyl group, isopropyl group, n-butyl group, isobutyl group, sec-butyl group, t-butyl group, neopentyl group, n-hexyl group etc.; a C2 to C30, preferably C2 to C20, linear or branched alkenyl group such as a vinyl group, allyl group, isopropenyl group etc.; a C2 to C30, preferably C2 to C20, linear or branched alkynyl group such as an ethynyl group, propargyl group etc.; a C3 to C30, preferably C3 to C20, saturated cyclic hydrocarbon group such as a cyclopropyl group, cyclobutyl group, cyclopentyl group, cyclohexyl group, adamantyl group etc.; a C5 to C30 unsaturated cyclic hydrocarbon group such as a cyclopentadienyl group, indenyl group, fluorenyl group etc.; a C6 to C30, preferably C6 to C20, aryl group such as a phenyl group, naphthyl group, biphenyl group, terphenyl group, phenanthryl group, anthracenyl group etc.; and an alkyl-substituted aryl group such as a tolyl group, iso-propylphenyl group, tert-butylphenyl group, dimethylphenyl group, di-tert-butylphenyl group etc.

The hydrocarbon group may be the one whose hydrogen atom is replaced by a halogen, and examples thereof include a C1 to C30, preferably C1 to C20, halogenated hydrocarbon group such as a trifluoromethyl group, pentafluorophenyl group, chlorophenyl group etc.

The hydrocarbon group may be substituted with other hydrocarbon groups, and examples thereof include an alkyl group substituted with an aryl group such as benzyl group, cumyl group, 2,2-diphenylethyl group, triphenylmethyl group etc.

The hydrocarbon group may have a heterocyclic compound residue; an oxygen-containing group such as an alkoxy group, aryloxy group, ester group, ether group, acyl group, carboxyl group, carbonate group, hydroxy group, peroxy group, carboxylic anhydride group etc.; a nitrogen-containing group such as an amino group, imino group, amide group, imido group, hydrazino group, hydrazono group, nitro group, nitroso group, cyano group, isocyano group, cyanate group, amidino group, diazo group, a group whose amino group is converted into an ammonium salt, etc.; a boron-containing group such as a borane diyl group, borane triyl group, diboranyl group etc.; a sulfur-containing group such as a mercapto group, thioester group, dithioester group, alkylthio group, arylthio group, thioacyl group, thioether group, thiocyanate group, isothiocyanate group, sulfone ester group, sulfonamide group, thiocarboxyl group, dithiocarboxyl group, sulfo group, sulfonyl group, sulfinyl group, sulphenyl group etc.; a phosphorus-containing group such as a phosphide group, phosphoryl group, thiophosphoryl group, phosphate group etc.; and a silicon-containing group, a germanium-containing group or a tin-containing group.

Particularly preferable among these are a C1 to C30, preferably C1 to C20, linear or branched alkyl group such as a methyl group, ethyl group, n-propyl group, isopropyl group, n-butyl group, isobutyl group, sec-butyl group, tert-butyl group, neopentyl group, n-hexyl group etc.; a C6 to C30, preferably C6 to C20, aryl group such as a phenyl group, naphthyl group, biphenyl group, terphenyl group, phenanthryl group, anthracenyl group etc.; and a substituted aryl group substituted with 1 to 5 substituent atoms or groups such as a halogen atom, a C1 to C30, preferably C1 to C20, alkyl group or alkoxy group, a C6 to C30, preferably C6 to C20, aryl group or aryloxy group.

The oxygen-containing group, the nitrogen-containing group, the boron-containing group, the sulfur-containing group and the phosphorus-containing group include the same groups as illustrated above.

The heterocyclic compound residue includes a nitrogen-containing compound residue such as pyrrole, pyridine, pyrimidine, quinoline, triazine etc.; an oxygen-containing compound residue such as furan, pyran etc.; and a sulfur-containing compound residue such as thiophene etc., and these heterocyclic compound residues may be further substituted with a substituent group such as a C1 to C30, preferably C1 to C20, substituent groups such as an alkyl group, alkoxy group etc.

The silicon-containing group includes a silyl group, siloxy group, hydrocarbon-substituted silyl group, hydrocarbon-substituted siloxy group etc., and specific examples include a methyl silyl group, dimethyl silyl group, trimethyl silyl group, ethyl silyl group, diethyl silyl group, triethyl silyl group, diphenylmethyl silyl group, triphenyl silyl group, dimethylphenyl silyl group, dimethyl-t-butyl silyl group, dimethyl(pentafluorophenyl) silyl group, etc. Preferable among these are a methyl silyl group, dimethyl silyl group, trimethyl silyl group, ethyl silyl group, diethyl silyl group, triethyl silyl group, dimethylphenyl silyl group, triphenyl silyl group, etc. Particularly, a trimethyl silyl group, triethyl silyl group, triphenyl silyl group, and dimethylphenyl silyl group are preferable. Specifically, the hydrocarbon-substituted siloxy group includes a trimethylsiloxy group etc.

The germanium-containing group or the tin-containing group includes those groups wherein silicon of the above silicon-containing group was replaced by germanium or tin.

Two or more groups of $R^1$ to $R^6$, preferably adjacent groups, may be bound to each other to form an aliphatic ring, an aromatic ring, or a hydrocarbon ring containing a heteroatom such as a nitrogen atom, and these rings may further have a substituent group.

When m is 2 or more, two of the groups represented by $R^1$ to $R^6$ may be bound to each other. When m is 2 or more, $R^1$s, $R^2$s, $R^3$s, $R^4$s, $R^5$s or $R^6$s may be the same or different.

n is a number satisfying the valence of M, and is specifically an integer of 0 to 5, preferably 1 to 4, more preferably 1 to 3.

X represents a hydrogen atom, a halogen atom, a hydrocarbon; group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by X's may be the same or different, and a plurality of groups represented by X's may be bound to one another to form a ring.

Hereinafter, specific examples are described.

The halogen atom includes fluorine, chlorine, bromine and iodine.

The hydrocarbon group includes the same groups as illustrated above in $R^1$ to $R^6$. Among these, a C1 to C20 hydrocarbon group is preferable.

The heterocyclic compound residue, the oxygen-containing group, the sulfur-containing group and the nitrogen-containing group include the same groups as illustrated above in $R^1$ to $R^6$.

Specifically, the boron-containing group includes $BR_4$ where R is hydrogen, an alkyl group, an optionally substituted aryl group, a halogen atom etc.

Specifically, the phosphorus-containing group includes, but is not limited to, a trialkylphosphine group such as a trimethylphosphine group, tributylphosphine group, tricyclohexylphosphine group etc.; a triarylphosphine group such as a triphenylphosphine group, tritolylphosphine group etc.; a phosphite group (phosphide group) such as a methylphosphite group, ethylphosphite group, phenylphosphite group etc.; aphosphonic acid group; andaphosphinic acid group.

The silicon-containing group, the germanium-containing group and the tin-containing group include the same groups as illustrated above in $R^1$ to $R^6$.

Specifically, the halogen-containing group includes, but is not limited to, a fluorine-containing group such as $PF_6$, $BF_4$ etc., a chlorine-containing group such as $ClO_4$, $SbCl_6$ etc., and an iodine-containing group such as $IO_4$ etc.

Specifically, the aluminum-containing group includes, but is not limited to, $AlR_4$ where R represents hydrogen, an alkyl group, an optionally substituted aryl group, a halogen atom etc.

When n is 2 or more, a plurality of groups represented by X's may be the same or different, and a plurality of groups represented by X's may be bound to one another to form a ring.

In the present invention, the group 4 transition metal complex preferable as the group 4 transition metal compound (A1) represented by the general formula [I] is represented by the following general formula [III]:

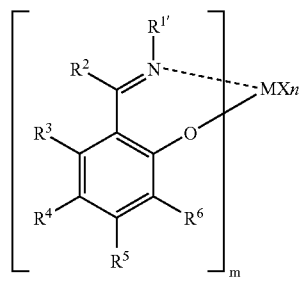

[III]

where M represents a transition metal atom in the group 4 in the periodic table, m represents an integer of 1 to 4, $R^{1\prime}$ is represented by the general formula [IV] or [V] below, $R^2$ to $R^6$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of these groups may be bound to one another to form a ring, and when m is 2 or more, two of the groups represented by $R^2$ to $R^6$ may be bound to each other provided that $R^{1\prime}$'s shall not be bound to each other, and n is a number satisfying the valence of M, X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by X's may be the same or different, and a plurality of groups represented by X's may be bound to one another to form a ring;

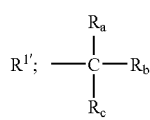

[IV]

where $R_a$ represents a hydrogen atom, an aliphatic hydrocarbon group or an alicyclic hydrocarbon group, and $R_b$ and $R_c$ each represent a hydrogen atom or a methyl group and may be the same or different;

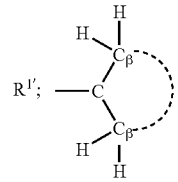

[V]

where the broken line indicates that two $C_\beta$s are bound directly to each other, or two $C_\beta$s are bound to each other via a C1 or more hydrocarbon group.

$R^{1\prime}$ is an aliphatic hydrocarbon group or alicyclic hydrocarbon group represented by the general formula [IV] or [V], and includes, for example, C1 to C3 hydrocarbon groups. Specific examples include methyl, ethyl, n-propyl, isopropyl, n-butyl, isobutyl, sec-butyl, tert-butyl, n-pentyl, tert-amyl, 1,2-dimethylpropyl, isoamyl, 1-methylbutyl, 2-methylbutyl, neopentyl, n-hexyl, 1,3-dimethylbuty, 3,3-dimethylbutyl, n-heptyl, 1-methylhexyl, n-octyl, 1,5-dimethylhexyl, 2-ethylhexyl, 1-methylheptyl, n-nonyl, n-decyl, n-undecyl, n-dodecyl,n-tridecyl,n-tetradecyl,n-pentadecyl,n-hexadecyl, n-heptadecyl, n-octadecyl, cyclopropyl, cyclobutyl, cyclopentyl, cyclohexyl, 4-tert-butylcyclohexyl, cycloheptyl, cyclooctyl, cyclododecyl, adamantyl, methylene cyclopropyl, methylene cyclobutyl, methylene cyclopentyl, methylene cyclohexyl, 1-cyclohexylethyl etc., among which $R^{1\prime}$ is preferably methyl, ethyl, n-propyl, n-hexyl, n-octadecyl, cyclohexyl, cycloheptyl, cyclooctyl, 4-tert-butylcyclohexyl, methylene cyclohexyl, isopropyl, 1-methylhexyl or 1,5-dimethylhexyl, particularly preferably 4-tert-butylcyclohexyl, methylene cyclohexyl, isopropyl, 1-methylhexyl or 1,5-dimethylhexyl.

As $R^2$ to $R^6$, $R^2$ to $R^6$ illustrated in the group 4 transition metal compound represented by the general formula [I] can be used without particular limitation.

When m is 2 or more, two of the groups represented by $R^2$ to $R^6$ may be bound to each other. When m is 2 or more, $R^2$s, $R^3$s, $R^4$s, $R^5$s or $R^6$s may be the same or different.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by X's may be the same or different, and a plurality of groups represented by X's may be bound to one another to form a ring.

n is a number satisfying the valence of M, and is specifically an integer of 0 to 5, preferably 1 to 4, more preferably 1 to 3.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and specifically X illustrated in the group 4 transition metal compound represented by the general formula [I] can be mentioned. When n is 2 or more, a plurality of groups represented by X's may be the same or different, and a plurality of groups represented by X's may be bound to one another to form a ring.

As the group 4 transition metal compound represented by the general formula [I] or [III], two or more different kinds of compounds can be used.

The method of producing the transition metal compound (A1) is not particularly limited, and the transition metal compound (A1) can be produced for example by a method described in the present applicant's Japanese Patent Application Laid-Open No. 11-315109 and EP0874005A1.

Specific examples of the 4 group transition metal compound represented by the general formula [III] include, but are not limited to, the following compounds:

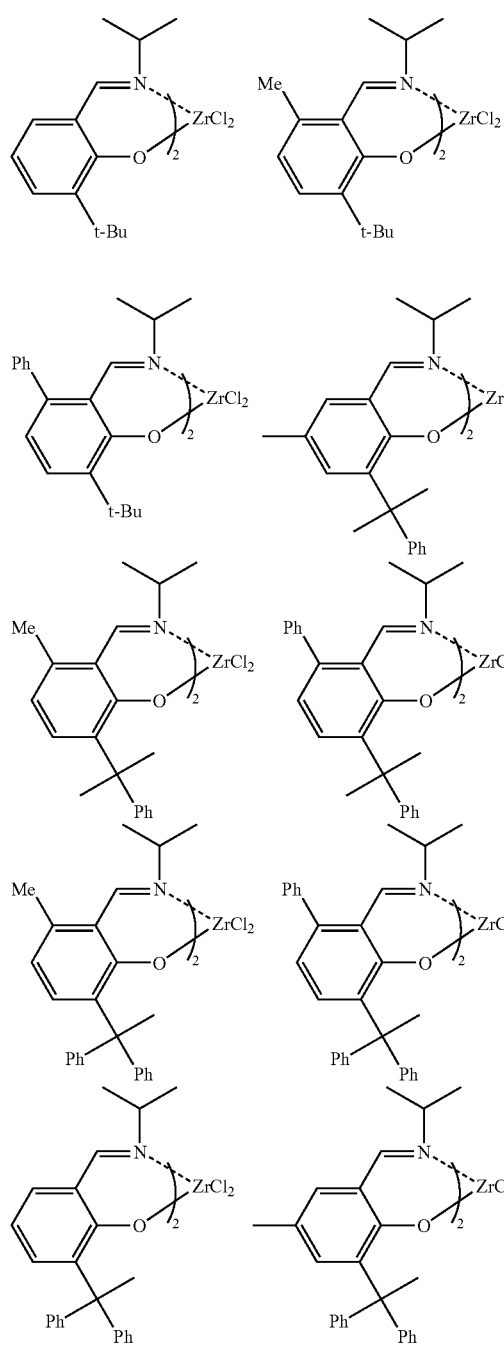

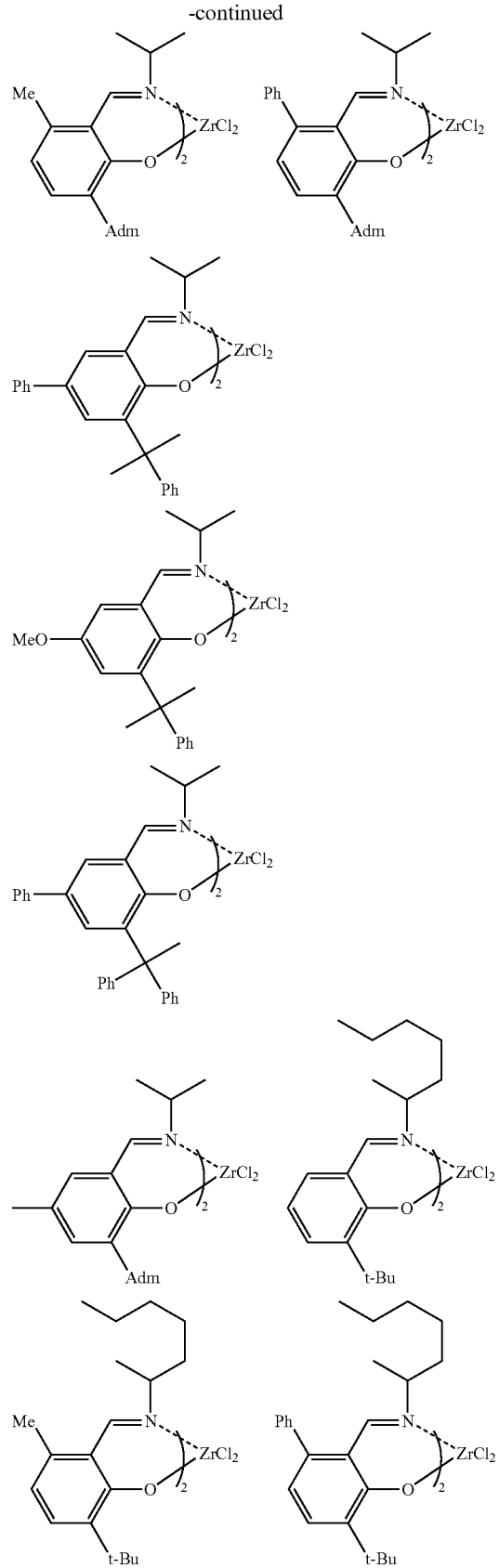

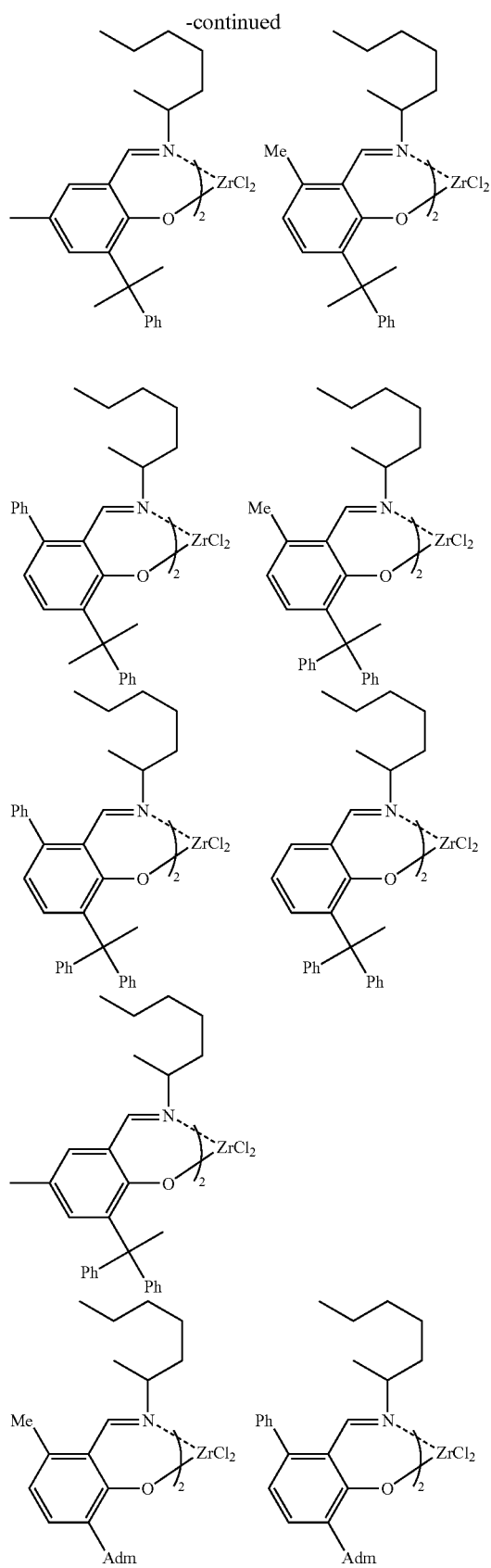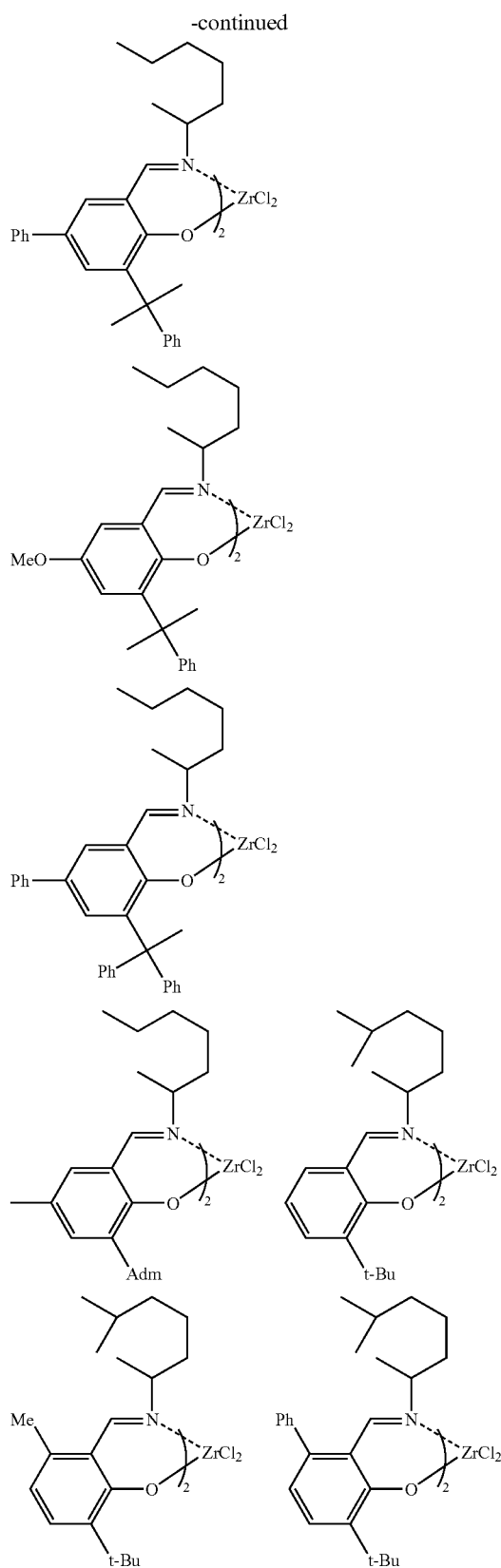

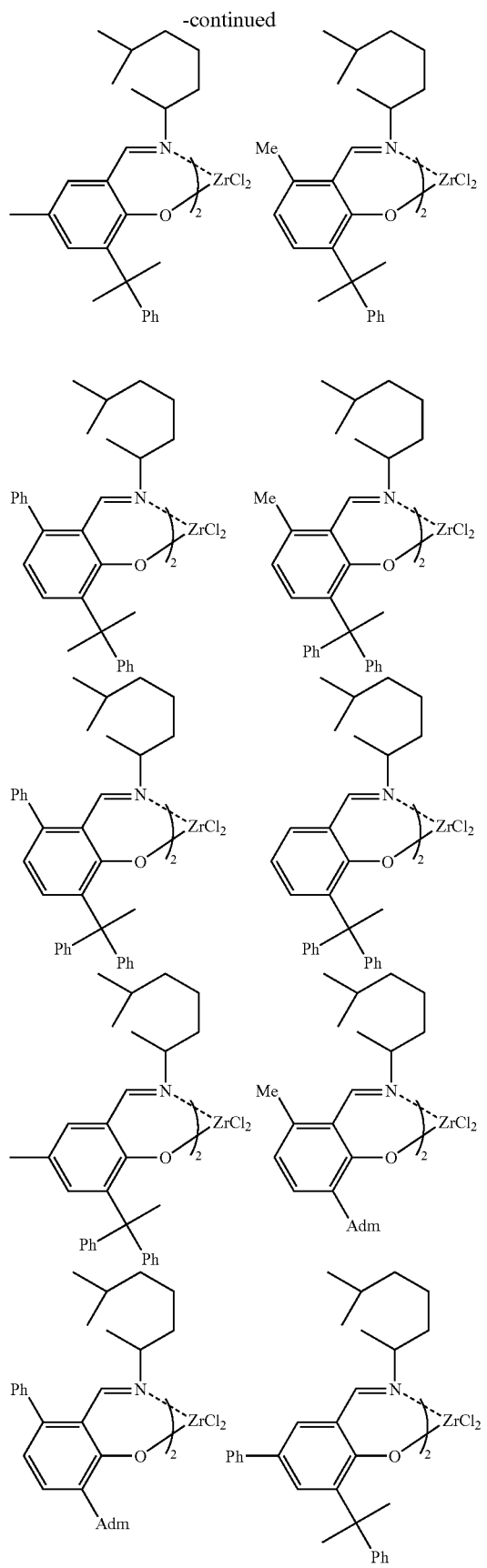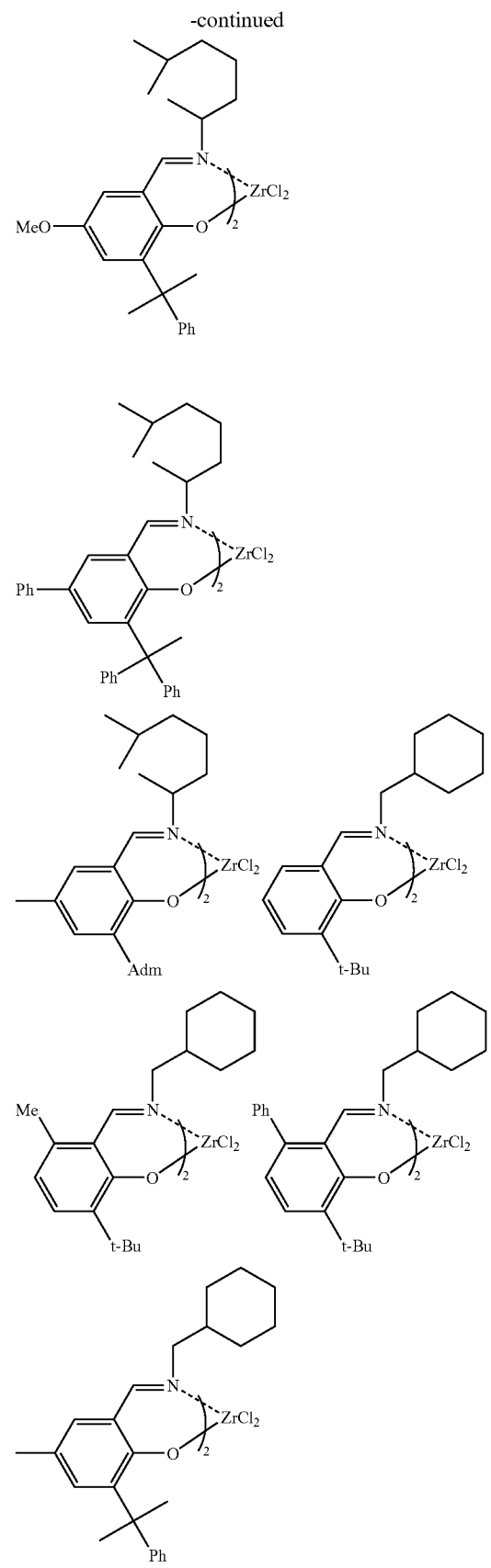

-continued
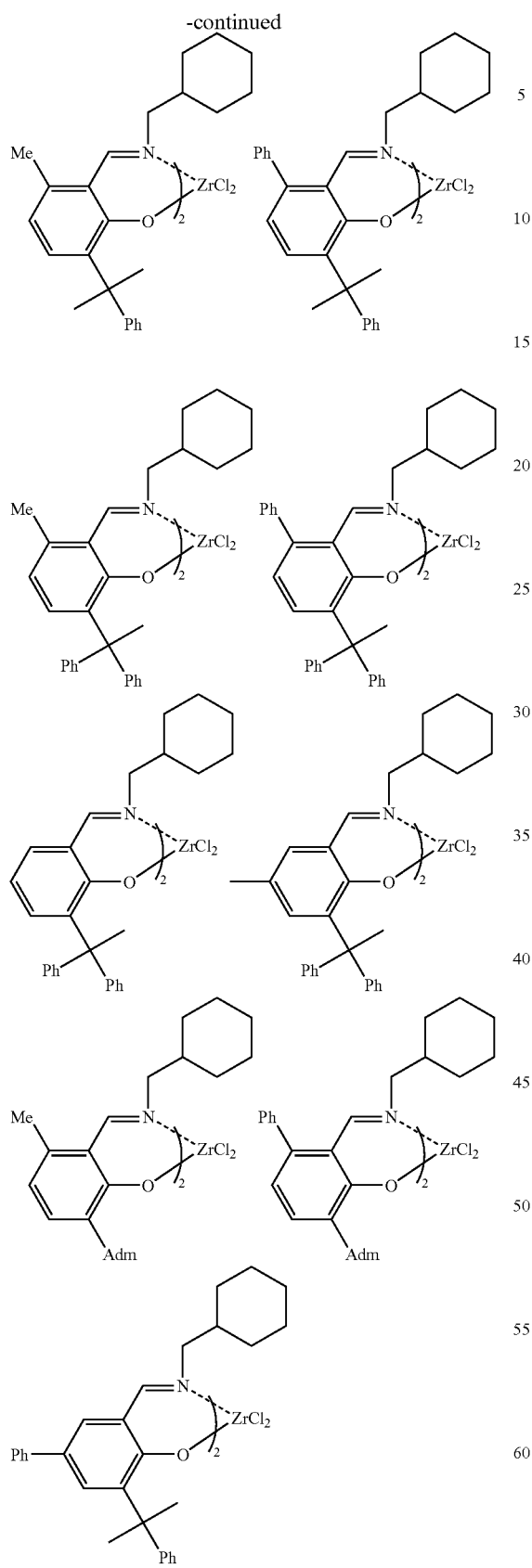
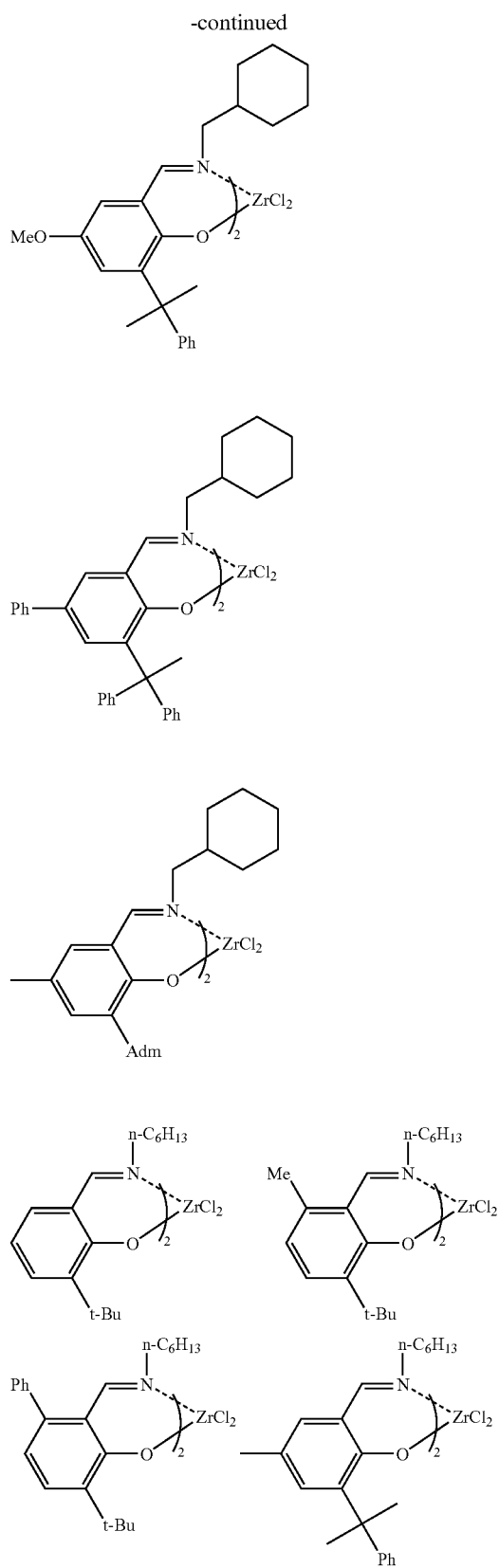

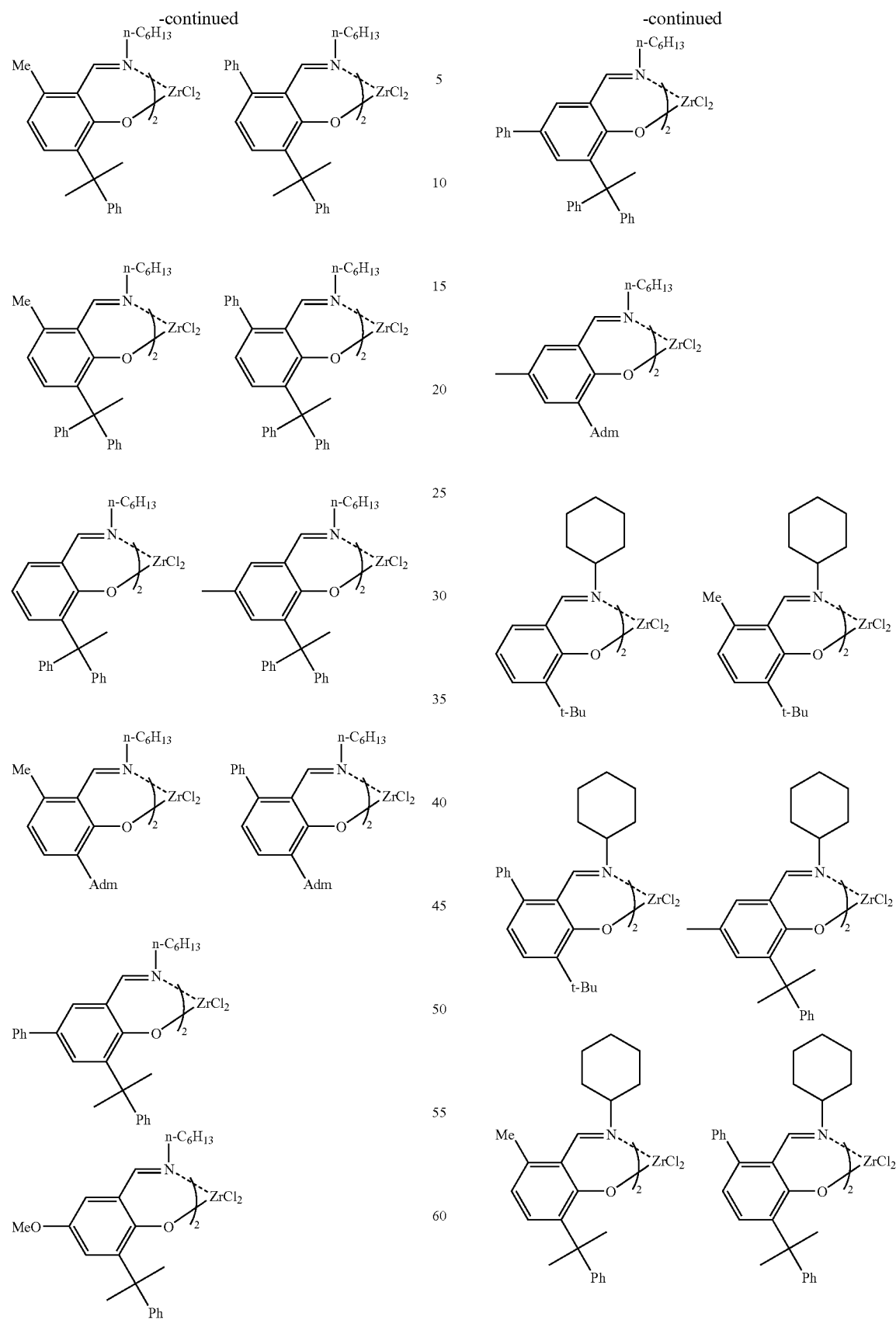

-continued
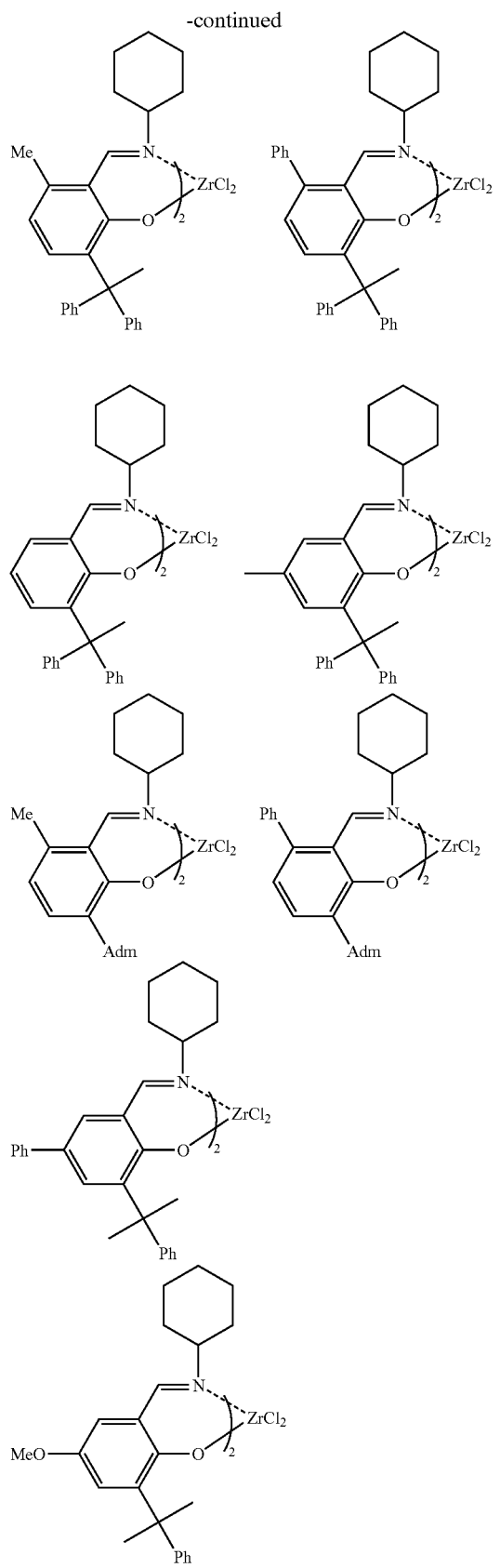
-continued
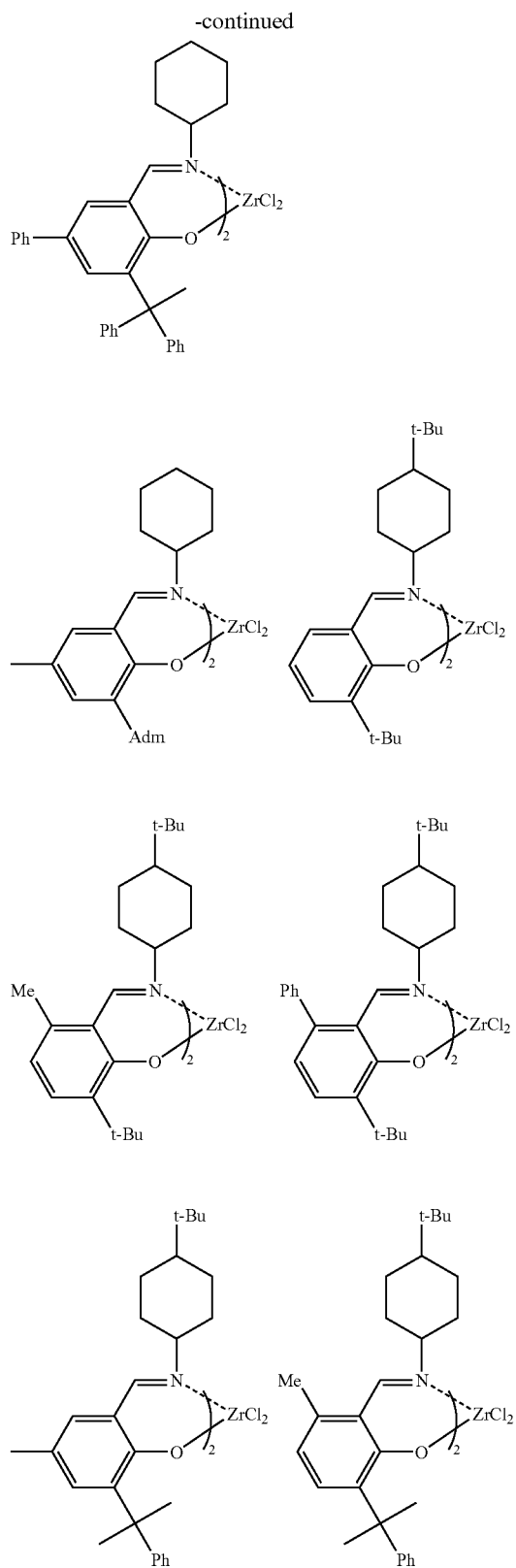

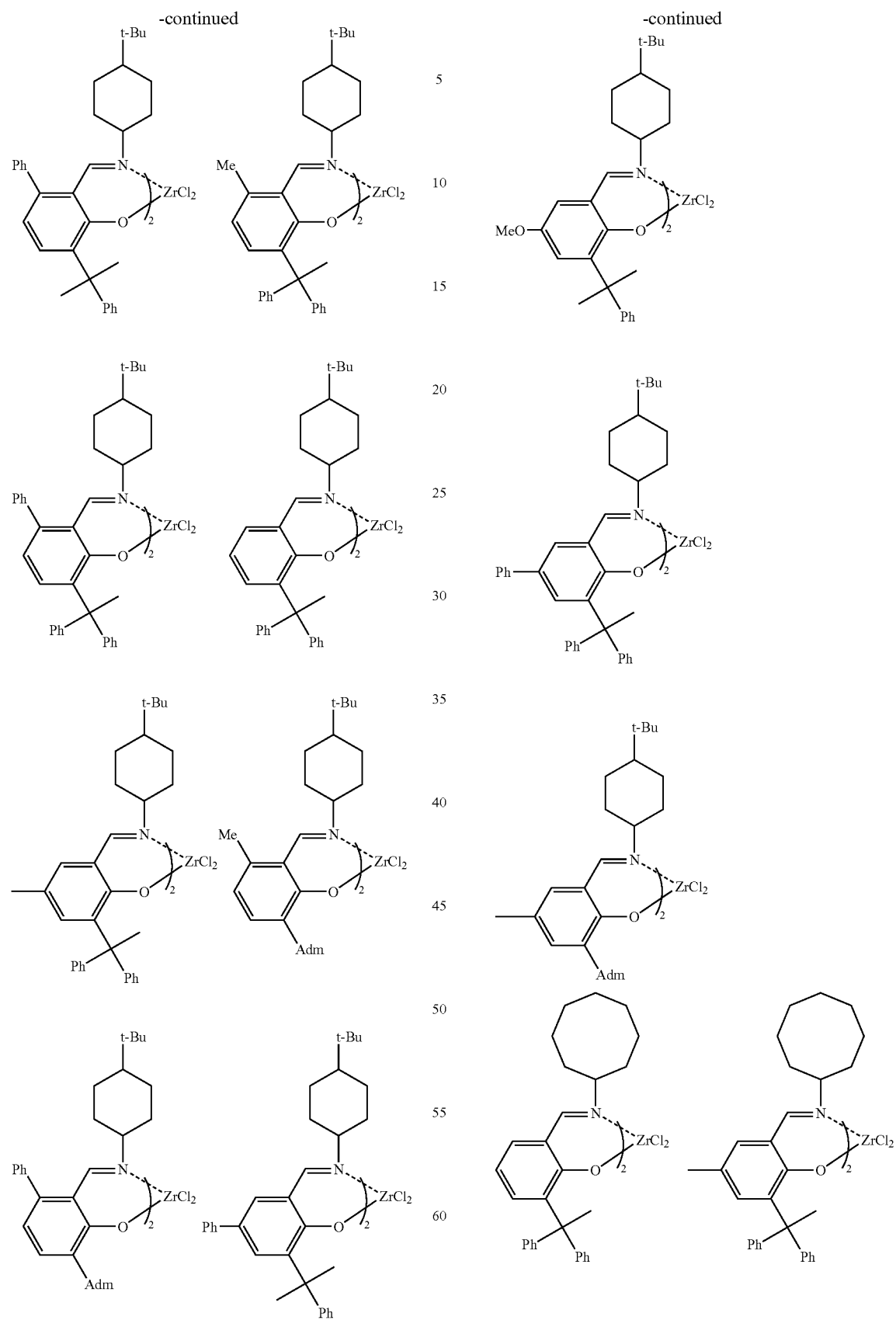

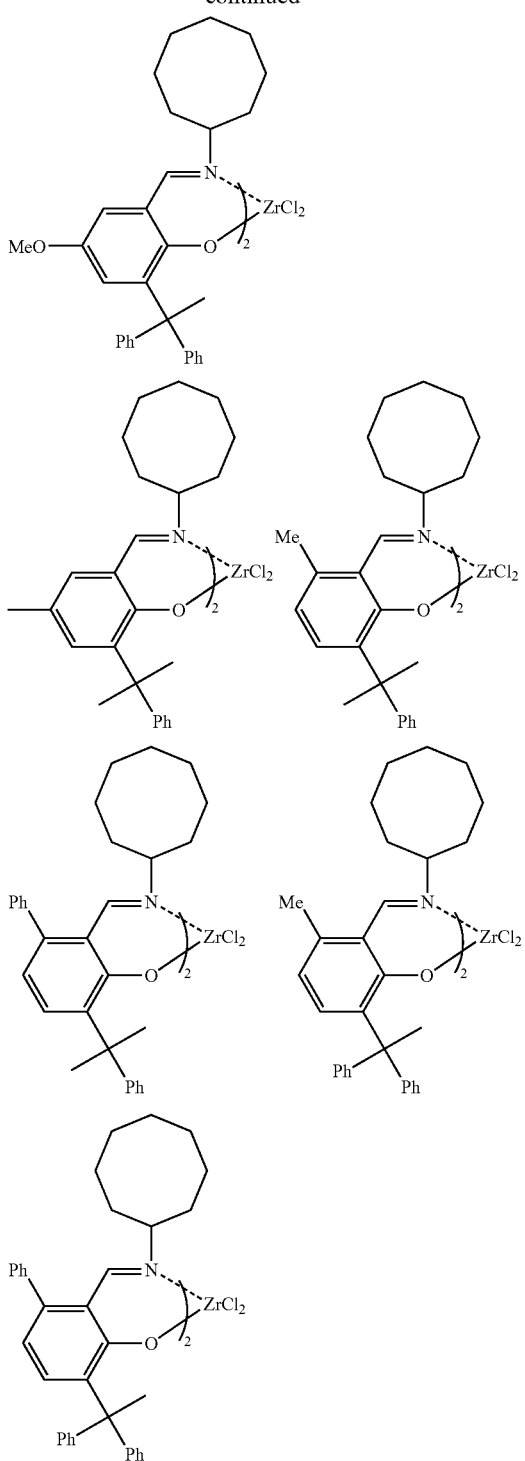

In the above examples, Me represents a methyl group, Et represents an ethyl group, 'Bu represents a tert-butyl group, and Ph represents a phenyl group.

In the present invention, the transition metal compounds wherein in the above compounds, a zirconium metal was replaced by a metal such as titanium or hafnium other than zirconium.

(A2) Group 4 Transition Metal Compound Represented by the General Formula [II]

The group 4 transition metal compound represented by the general formula [II] in the present invention is the following crosslinked metallocene compound:

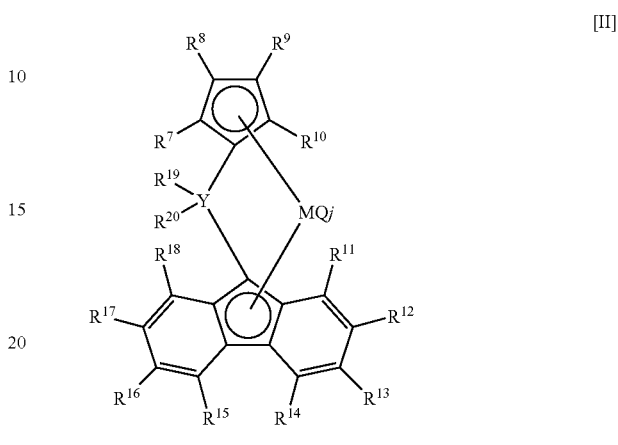

[II]

where $R^7$ to $R^{20}$ are selected from hydrogen, a hydrocarbon group and a silicon-containing group, and may be the same or different, adjacent substituents R7 to $R^{20}$ may be bound to each other to form a ring, M is a group 4 transition metal atom, Y is a group 14 metal atom, Q may be selected in the same or different combination from a halogen, a hydrocarbon group, an anion ligand, and a neutral ligand capable of coordination with a lone pair of electrons, and j is an integer of 1 to 4.

Specifically, the hydrocarbon group of $R^7$ to $R^{20}$ includes a C1 to C20 alkyl group, a C7 to C20 alkyl group, a C6 to C20 aryl group etc. Examples include a methyl group, ethyl group, n-propyl group, isopropyl group, allyl group, n-butyl group, tert-butyl group, amyl group, n-pentyl group, n-hexyl group, n-heptyl group, n-octyl group, n-nonyl group, n-decanyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methyl-1-isopropyl-2-methylpropyl group, cyclopentyl group, cyclohexyl group, cycloheptyl group, cyclooctyl group, norbornyl group, adamantyl group, phenyl group, naphthyl group, biphenyl group, phenanthryl group, anthracenyl group, benzyl group, cumyl group, methoxy group, ethoxy group, phenoxy group, N-methylamino group, N,N-dimethylamino group, N-phenylamino group etc.

The silicon-containing group can include a trimethyl silyl group, triethyl silyl group, diphenylmethyl silyl group, dimethylphenyl silyl group etc.

Mention is also made of a cyclohexyl group, cyclopentyl group, adamantyl group etc. where $R^{19}$ and $R^{20}$ are bound to each other to form a ring.

In preferable modes of $R^{19}$ and $R^{20}$, at least one of $R^{19}$ and $R^{20}$ is an unsubstituted aryl group or a substituted aryl group. In this case, when the two are either unsubstituted aryl groups or substituted aryl groups, $R^{19}$ and $R^{20}$ may be the same or different.

88 More specifically, when $R^{19}$ and $R^{20}$ are unsubstituted aryl groups or substituted aryl groups, mention is made of a C6 to C30, preferably C6 to C20, aryl group such as a phenyl group, naphthyl group, biphenyl group, terphenyl group, phenanthryl group, anthracenyl group etc. and an alkyl-substituted aryl group such as a tolyl group, iso-propylphenyl group, tert-butylphenyl group, ethylphenyl group, dimethylphenyl group, di-tert-butylphenyl group etc. Further examples include a substituted aryl group substituted with 1 to 5 substituent atoms or groups such as a halogen atom, a C1 to C30, preferably C1 to C20, alkyl group or alkoxy group, a C6 to C30, preferably C6 to C20, aryl group or aryloxy group, and a halogen-containing hydrocarbon group such as a chlorophenyl group, dichlorophenyl group, fluorophenyl group, difluorophenyl group, trifluoromethylphenyl group, di(trifluoromethyl)phenyl group etc.

The covalent bonding atom Y for bonding the cyclopentadienyl ligand to the fluorenyl ligand is the group 14 atom which is a carbon atom, a silicon atom, a germanium atom, an alkylene group, a substituted alkylene group, a silylene group, a substituted silylene group or the like. Specific examples include, for example, crosslinking moieties consisting of C6 to C20 unsaturated hydrocarbon groups such as —C(C$_6$H$_5$)$_2$—, —C(C$_6$H$_5$) (p-CH$_3$C$_6$H$_5$)—, —C(p-CH$_3$C$_6$H$_5$) (p-CH$_3$C$_6$H$_5$)—, —C(tert-BuC$_6$H$_5$) (tert-BuC$_6$H$_5$)—, —SiC(C$_6$H$_5$)$_2$—, —Si(C$_6$H$_5$) (p-CH$_3$C$_6$H$_5$) —, —Si (p-CH$_3$C$_6$H$_5$) (p-CH$_3$C$_6$H$_5$)—, —Si(tert-BuC$_6$H$_5$) (tert-BuC$_6$H$_5$)— etc.

Q is selected in the same or different combination from a halogen, a hydrocarbon group, an anion ligand, and a neutral ligand capable of coordination with a lone pair of electrons. j is an integer of 1 to 4, and when j is 2 or more, Q may be the same or different.

Examples of the halogen atom include fluorine, chlorine, bromine and iodine, and examples of the hydrocarbon group include those described above.

Examples of the anion ligand include an alkoxy group such as methoxy, tert-butoxy, phenoxy etc., a carboxylate group such as acetate, benzoate etc., a sulfonate group such as mesylate, tosylate etc.

Specific examples of the neutral ligand capable of coordination with a lone pair include organic phosphorus compounds such as trimethyl phosphine, triethyl phosphine, triphenyl phosphine, diphenyl methyl phosphine etc., and ethers such as tetrahydrofuran, diethyl ether, dioxane, 1,2-dimethoxyethane etc. At least one of Q's is preferably a halogen or an alkyl group.

The group 4 transition metal compounds represented by the general formula [II] include, but are not limited to, the following examples:

Di(m-tolyl) methylene(cyclopentadienyl) (2,7-di-tert-butylfluorenyl) zirconium dichloride, di(m-tolyl) methylene (cyclopentadienyl) (3,6-di-tert-butylfluorenyl) zirconium dichloride, di(m-tolyl) methylene(cyclopentadienyl) (octamethyloctahydrodibenzofluorenyl) zirconium dichloride, di(m-tolyl) methylene (cyclopentadienyl) (fluorenyl) zirconium dichloride, di(m-trifluoromethyl-phenyl) methylene (cyclopentadienyl) (2,7-di-tert-butylfluorenyl) zirconium dichloride, di (m-trifluoromethyl-phenyl) methylene (cyclopentadienyl) (3,6-di-tert-butylfluorenyl) zirconium dichloride, di(m-trifluoromethyl-phenyl) methylene (cyclopentadienyl) (octamethyloctahydrodibenzofluorenyl). zirconium dichloride, di (m-trifluoromethyl-phenyl) methylene (cyclopentadienyl) (fluorenyl) zirconium dichloride, di(p-trifluoromethyl-phenyl) methylene (cyclopentadienyl) (2,7-di-tert-butylfluorenyl) zirconium dichloride, di(p-trifluoromethyl-phenyl) methylene (cyclopentadienyl) (3,6-di-tert-butylfluorenyl) zirconium dichloride, di(p-trifluoromethyl-phenyl) methylene (cyclopentadienyl) (octamethyloctahydrodibenzofluorenyl) zirconium dichloride, di(p-trifluoromethyl-phenyl) methylene (cyclopentadienyl) (fluorenyl) zirconium dichloride, di(p-tolyl) methylene (cyclopentadienyl) (2,7-dimethylfluorenyl) zirconium dichloride, di(p-tolyl) methylene (cyclopentadienyl) (3,6-di-tert-butylfluorenyl) zirconium dichloride, di(p-isopropylphenyl) methylene (cyclopentadienyl) (cyclopentadienyl) (octamethyloctahydrodibenzofluorenyl) zirconium dichloride, di(p-tert-butylphenyl) methylene (cyclopentadienyl) (cyclopentadienyl) (octamethyloctahydrodibenzofluorenyl) zirconium dichloride, di(p-tolyl) methylene (cyclopentadienyl) (cyclopentadienyl) (octamethyloctahydrodibenzofluorenyl) zirconium dimethyl, cyclopentylidene (cyclopentadienyl) (2,7-di-tert-butylfluorenyl) zirconium dichloride, cyclohexylidene (cyclopentadienyl) (2,7-di-tert-butylfluorenyl) zirconium dichloride, adamantylidene (cyclopentadienyl) (2,7-di-tert-butylfluorenyl) zirconium dichloride, cyclopentylidene (cyclopentadienyl) (3,6-di-tert-butylfluorenyl) zirconium dichloride, cyclohexylidene (cyclopentadienyl) (3,6-di-tert-butylfluorenyl) zirconium dichloride, adamantylidene (cyclopentadienyl) (3,6-di-tert-butylfluorenyl) zirconium dichloride, cyclopropylidene (cyclopentadienyl) (3,6-dimethyl-fluorenyl) zirconium dichloride, cyclobutylidene (cyclopentadienyl) (3,6-dimethyl-fluorenyl) zirconium dichloride, cyclopentylidene (cyclopentadienyl) (3,6-dimethyl-fluorenyl) zirconium dichloride, cyclohexylidene (cyclopentadienyl) (3,6-dimethyl-fluorenyl) zirconium dichloride, cycloheptylidene (cyclopentadienyl) (3,6-dimethyl-fluorenyl) zirconium dichloride, cyclopropylidene (cyclopentadienyl) (3,6-di-tert-fluorenyl) zirconiumdichloride, cyclobutylidene (cyclopentadienyl) (3,6-di-tert-fluorenyl) zirconium dichloride, cyclopentylidene (cyclopentadienyl) (3,6-di-tert-fluorenyl) zirconiumdichloride, cyclohexylidene (cyclopentadienyl) (3,6-di-tert-fluorenyl) zirconium dichloride, cycloheptylidene (cyclopentadienyl) (3,6-di-tert-fluorenyl) zirconium dichloride, cyclopropylidene (cyclopentadienyl) (3,6-dicumyl-fluorenyl) zirconium dichloride, cyclobutylidene (cyclopentadienyl) (3,6-dicumyl-fluorenyl) zirconium dichloride, cyclopentylidene (cyclopentadienyl) (3,6-dicumyl-fluorenyl) zirconium dichloride, cyclohexylidene (cyclopentadienyl) (3,6-dicumyl-fluorenyl) zirconium dichloride, cycloheptylidene (cyclopentadienyl) (3,6-dicumyl-fluorenyl) zirconium aichloride, cyclopropylidene (cyclopentadienyl) (3, 6-di-tert-fluorenyl) zirconium dibromride, cyclobutylidene (cyclopentadienyl) (3,6-di-tert-fluorenyl) zirconium dibromide, cyclopentylidene (cyclopentadienyl) (3, 6-di-tert-fluorenyl) zirconium dibromide, cyclohexylidene (cyclopentadienyl) (3,6-di-tert-fluorenyl) zirconium dibromide, cycloheptylidene (cyclopentadienyl) (3,6-di-tert-fluorenyl) zirconiumdibromide, cyclopropylidene (cyclopentadienyl) (2,7-di-tert-fluorenyl) zirconium dichloride, cycloprobutylidene (cyclopentadienyl) (2,7-di-tert-fluorenyl) zirconium dichloride, cyclopentylidene (cyclopentadienyl) (2,7-di-tert-fluorenyl) zirconium dichloride, cyclohexylidene (cyclopentadienyl) (2,7-di-tert-fluorenyl) zirconium dichloride, cycloheptylidene (cyclopentadienyl) (2,7-di-tert-fluorenyl) zirconium dichloride, cyclopropylidene (cyclopentadienyl) (octamethyloctahydrodibenzofluorenyl) zirconium dichloride, cyclobutylidene (cyclopentadienyl) (octamethyloctahydrodibenzofluorenyl) zirconium dichloride, cyclopentylidene (cyclopentadienyl) (octamethyloctahydrodibenzofluorenyl) zirconium dichloride, cyclohexylidene (cyclopentadienyl) (octamethyloctahydrodibenzofluorenyl) zirconium dichloride, cycloheptylidene (cyclopentadienyl) (octamethyloctahydrodibenzofluorenyl) zirconium dichloride, cyclopropylidene (cyclopentadienyl) (octamethyloctahydrodibenzofluorenyl) zirconium dibromide, cyclobutylidene (cyclopentadienyl) (octamethyloctahydrodibenzofluorenyl) zirconium dibromide, cyclopentylidene (cyclopentadienyl) (octamethyloctahydrodibenzofluorenyl) zirconium dibromide, cyclohexylidene (cyclopentadienyl) (octamethyloctahydrodibenzofluorenyl) zirconium dibromide, cycloheptylidene (cyclopentadienyl) (octamethyloctahydrodibenzofluorenyl) zirconium dibromide, cyclopropylidene (cyclopentadienyl) (octamethyloctahydrodibenzofluorenyl) zirconium dimethyl, cyclobutylidene (cyclopentadienyl) (octamethyloctahydrodibenzofluorenyl) zirconium dimethyl, cyclopentylidene (cyclopentadienyl) (octamethyloctahydrodibenzofluorenyl) zirconium dimethyl, cyclohexylidene (cyclopentadienyl) (octamethyloctahydrodibenzofluorenyl) zirconium dimethyl, cycloheptylidene (cyclopentadienyl) (octamethyloctahydrodibenzofluorenyl) zirconium dimethyl, di-n-butylmethylene (cyclopentadienyl) (fluorenyl) zirconium dichloride, di-n-butylmethylene (cyclopentadienyl) (2,7-di-tert-butylfluorenyl) zirconium dichloride, di-n-butylmethylene (cyclopentadienyl) (3,6-di-tert-butyl fluorenyl) zirconium dichloride, di-n-butylmethylene (cyclopentadienyl) (octamethyloctahydrodibenzofluorenyl) zirconium dichloride, di-n-butylmethylene (cyclopentadienyl) (benzofluorenyl) zirconium dichloride, di-n-butylmethylene (cyclopentadienyl) (dibenzofluorenyl) zirconium dichloride, di-n-butylmethylene (cyclopentadienyl) (octahydrodibenzofluorenyl) zirconium dichloride, di-n-butylmethylene (cyclopentadienyl) (octamethyltetrahydrodicyclopentafluorenyl) zirconium dichloride, diisobutylmethylene (cyclopentadienyl) (2,7-di-tert-butylfluorenyl) zirconium dichloride, diisobutylmethylene (cyclopentadienyl) (3,6-di-tert-butylfluorenyl) zirconium dichloride, diisobutyimethylene (cyclopentadienyl) (octamethyloctahydrodibenzofluorenyl) zirconium dichloride., diisobutylmethylene (cyclopentadienyl) (benzofluorenyl) zirconium dichloride, diisobutylmethylene (cyclopentadienyl) (dibenzofluorenyl) zirconium dichloride, diisobutylmethylene (cyclopentadienyl) (octahydrodibenzofluorenyl) zirconium dichloride, diisobutylmethylene (cyclopentadienyl) (octamethyltetrahydrodicyclopentafluorenyl) zirconium dichloride, dibenzylmethylene (cyclopentadienyl) (2,7-di-tert-butylfluorenyl) zirconium dichloride, dibenzylmethylene (cyclopentadienyl) (3,6-di-tert-butylfluorenyl) zirconium dichloride, dibenzylmethylene (cyclopentadienyl) (octamethyloctahydrodibenzofluorenyl) zirconium dichloride, dibenzylmethylene (cyclopentadienyl) (benzofluorenyl) zirconium dichloride, dibenzylmethylene (cyclopentadienyl) (dibenzofluorenyl) zirconium dichloride, dibenzylmethylene (cyclopentadienyl) (octahydrodibenzofluorenyl) zirconium dichloride, dibenzylmethylene (cyclopentadienyl) (octamethyltetrahydrodicyclopentafluorenyl) zirconium dichloride, diphenethylmethylene (cyclopentadienyl) (2,7-di-tert-butylfluorenyl) zirconium dichloride, diphenethylmethylene (cyclopentadienyl) (3,6-di-tert-butylfluorenyl) zirconium dichloride, diphenethylmethylene (cyclopentadienyl) (octamethyloctahydrodibenzofluorenyl) zirconium dichloride, diphenethylmethylene (cyclopentadienyl) (benzofluorenyl) zirconiumdichloride, diphenethylmethylene (cyclopentadienyl) (dibenzofluorenyl) zirconiumdichloride, diphenethylmethylene (cyclopentadienyl) (octahydrodibenzofluorenyl) zirconium dichloride, diphenethylmethylene (cyclopentadienyl) (octamethyltetrahydrodicyclopentafluorenyl) zirconium dichloride, di(benzhydryl) methylene (cyclopentadienyl) (2,7-di-tert-butylfluorenyl) zirconium dichloride, di(benzhydryl) methylene (cyclopentadienyl) (3,6-di-tert-butylfluorenyl) zirconium dichloride, di(benzhydryl) methylene (cyclopentadienyl) (octamethyloctahydrodibenzofluorenyl) zirconium dichloride, di(benzhydryl) methylene (cyclopentadienyl) (benzofluorenyl) zirconium dichloride, di(benzhydryl) methylene (cyclopentadienyl) (dibenzofluorenyl) zirconium dichloride, di(benzhydryl) methylene (cyclopentadienyl) (octahydrodibenzofluorenyl) zirconium dichloride, di(benzhydryl) methylene (cyclopentadienyl) (octamethyltetrahydrocyclopentafluorenyl) zirconium dichloride, di (cumyl) methylene (cyclopentadienyl) (fluorenyl) zirconium dichloride, di(cumyl) methylene (cyclopentadienyl) (2,7-di-tert-butylfluorenyl) zirconium dichloride, di(cumyl) methylene (cyclopentadienyl) (3,6-di-tert-butylfluorenyl) zirconium dichloride, di(cumyl) methylene (cyclopentadienyl) (octamethyloctahydrodibenzofluorenyl) zirconium dichloride, di(cumyl) methylene (cyclopentadienyl) (benzofluorenyl) zirconium dichloride, di(cumyl) methylene (cyclopentadienyl) (dibenzofluorenyl) zirconium dichloride, di(cumyl) methylene (cyclopentadienyl) (octahydrodibenzofluorenyl) zirconium dichloride, di(cumyl) methylene (cyclopentadienyl) (octamethyltetrahydrodicyclopentafluorenyl) zirconium dichloride, di(1-phenyl-ethyl) methylene (cyclopentadienyl) (2,7-di-tert-butylfluorenyl) zirconium dichloride, di(1-phenyl-ethyl) methylene (cyclopentadienyl) (3,6-di-tert-butylfluorenyl) zirconium dichloride, di(1-phenyl-ethyl) methylene (cyclopentadienyl) (octamethyloctahydrodibenzofluorenyl) zirconium dichloride, di(1-phenyl-ethyl) methylene (cyclopentadienyl) (dibenzofluorenyl) zirconium dichloride, di(1-phenyl-ethyl) methylene (cyclopentadienyl) (octahydrodibenzofluorenyl) zirconium dichloride, di(1-phenyl-ethyl) methylene (cyclopentadienyl) (octamethyltetrahydrodicyclopentafluorenyl) zirconium dichloride, di (cyclohexylmethyl) methylene (cyclopentadienyl) (octamethyloctahydrodibenzofluorenyl) zirconium dichloride, di(cyclohexylmethyl) methylene (cyclopentadienyl) (benzofluorenyl) zirconium dichloride, di(1-cyclohexyl-ethyl) methylene (cyclopentadienyl) (octahydrodibenzofluorenyl) zirconium dichloride, di(cyclopentylmethyl) methylene (cyclopentadienyl) (octamethyloctahydrodibenzofluorenyl) zirconium dichloride, di(cyclopentylmethyl) methylene (cyclopentadienyl) (benzofluorenyl) zirconium dichloride, di(cyclopentylmethyl) methylene (cyclopentadienyl) (dibenzofluorenyl) zirconium dichloride, di(cyclopentylmethyl) methylene (cyclopentadienyl) (octahydrodibenzofluorenyl) zirconium dichloride, di(cyclopentylmethyl) methylene (cyclopentadienyl) (octamethyltetrahydrodicyclopentafluorenyl) zirconium dichloride, di(naphthylmethyl) methylene (cyclopentadienyl) (2,7-di-tert-butylfluorenyl) zirconium dichloride, di(naphthylmethyl) methylene (cyclopentadienyl) (3,6-di-tert-butylfluorenyl) zirconium dichloride, di(naphthylmethyl) methylene (cyclopentadienyl) (octamethyloctahydrodibenzofluorenyl) zirconium dichloride, di(naphthylmethyl) methylene (cyclopentadienyl) (benzofluorenyl) zirconium dichloride, di(naphthylmethyl) methylene (cyclopentadienyl) (dibenzofluorenyl) zirconium dichloride, di(naphthylmethyl) methylene (cyclopentadienyl) (octahydrodibenzofluorenyl) zirconium dichloride, di(naphthylmethyl) methylene (cyclopentadienyl) (octamethyltetrahydrodicyclopentafluorenyl) zirconium dichloride, di(biphenylmethyl) methylene (cyclopentadienyl) (fluorenyl) zirconium dichloride, di (biphenylmethyl) methylene (cyclopentadienyl) (2,7-di-tert-butylfluorenyl) zirconium dichloride, di(biphenylmethyl) methylene-(cyclopentadienyl) (3,6-di-tert-butylfluorenyl) zirconium dichloride, di(biphenylmethyl) methylene (cyclopentadienyl) (octamethyloctahydrodibenzofluorenyl) zirconium dichloride, di(biphenylmethyl) methylene (cyclopentadienyl) (benzofluorenyl) zirconium dichloride, di(biphenylmethyl) methylene (cyclopentadienyl) (dibenzofluorenyl) zirconium dichloride, di(biphenylmethyl) methylene (cyclopentadienyl) (octahydrodibenzofluorenyl)

zirconium dichloride, di(biphenylmethyl) methylene (cyclopentadienyl) (octamethyltetrahydrodicyclopentafluorenyl) zirconium dichloride, dimethylmethylene (cyclopentadienyl) (3,6-di-tert-butylfluorenyl) zirconium dichloride, dimethylmethylene (cyclopentadienyl) (octamethyloctahydrodibenzofluorenyl) zirconium-dichloride, dimethylmethylene (cyclopentadienyl) (benzofluorenyl) zirconium dichloride, dimethylmethylene (cyclopentadienyl) (dibenzofluorenyl) zirconium dichloride, dimethylmethylene (cyclopentadienyl) (octahydrodibenzofluorenyl) zirconium dichloride, dimethylmethylene (cyclopentadienyl) (octamethyltetrahydrodicyclopentafluorenyl) zirconium dichloride, dimethylsilylene (cyclopentadienyl) (2,7-di-tert-butylfluorenyl) zirconium dichloride, dimethylsilylene (cyclopentadienyl) (3,6-di-tert-butylfluorenyl) zirconium dichloride, dimethylsilylene (cyclopentadienyl) (octamethyloctahydrodibenzofluorenyl) zirconium dichloride, dimethylsilylene (cyclopentadienyl) (benzofluorenyl) zirconium di-chloride, dimethylsilylene (cyclopentadienyl) (dibenzofluorenyl) zirconium dichloride, dimethylsilylene (cyclopentadienyl) (octahydrodibenzofluorenyl) zirconium dichloride, dimethylsilylene (cyclopentadienyl) (octamethyltetrahydrodicyclopentafluorenyl) zirconium dichloride, cyclopentylidene (cyclopentadienyl) (2,7-di-tert-butylfluorenyl) zirconium dichloride, cyclohexylidene (cyclopentadienyl) (2,7-di-tert-butylfluorenyl) zirconium dichloride, adamantylidene (cyclopentadienyl) (2,7-di-tert-butylfluorenyl) zirconium dichloride, dimethylmethylene (cyclopentadienyl) (2,7-di-tert-butylfluorenyl) zirconium dichloride, diphenylmethylene (cyclopentadienyl) (2,7-di-tert-butylfluorenyl) zirconium dichloride, di(p-tolyl) methylene (cyclopentadienyl) (2,7-di-tert-butylfluorenyl) zirconium dichloride, diethylmethylene (cyclopentadienyl) (2,7-di-tert-butylfluorenyl) zirconium dichloride, cyclopentylidene (cyclopentadienyl) (3,6-di-tert-butylfluorenyl) zirconium dichloride, cyclohexylidene (cyclopentadienyl) (3,6-di-tert-butylfluorenyl) zirconium dichloride, adamantylidene (cyclopentadienyl) (3,6-di-tert-butylfluorenyl) zirconium dichloride, dimethylmethylene (cyclopentadienyl) (3,6-di-tert-butylfluorenyl) zirconium dichloride, diphenylmethylene (cyclopentadienyly (3,6-di-tert-butylfluorenyl) zirconium dichloride, di(p-tolyl) methylene (cyclopentadienyl) (3,6-di-tert-butylfluorenyl) zirconium dichloride, diethylmethylene (cyclopentadienyl) (3,6-di-tert-butylfluorenyl) zirconium dichloride, monophenylmonomethylmethylene (cyclopentadienyl) (2,7-di-tert-butylfluorenyl) zirconium dichloride, diphenylmethylene (cyclopentadienyl) (2,7-di-tert-butylfluorenyl) zirconium dichloride, di(p-tolyl) methylene (cyclopentadienyl) (2,7-di-tert-butylfluorenyl) zirconium dichloride, monophenylmonomethylmethylene (cyclopentadienyl) (3,6-di-tert-butylfluorenyl) zirconium dichloride, diphenylmethylene (cyclopentadienyl). (3,6-di-tert-butylfluorenyl) zirconium dichloride, di(p-tolyl) methylene (cyclopentadienyl) (3,6-di-tert-butylfluorenyl) zirconium dichloride, monophenylmonomethylmethylene (cyclopentadienyl) (2,7-di-tert-butylfluorenyl) hafnium dichloride, diphenylmethylene (cyclopentadienyl) (2,7-di-tert-butylfluorenyl) hafnium dichloride, di(p-tolyl) methylene (cyclopentadienyl) (2,7-di-tert-butylfluorenyl) hafnium dichloride., monophenylmonomethylmethylene (cyclopentadienyl) (2,7-di-tert-butylfluorenyl) titanium dichloride, diphenylmethylene (cyclopentadienyl) (2,7-di-tert-butylfluorenyl) titanium dichloride, di(p-tolyl) methylene (cyclopentadienyl) (2,7-di-tert-butylfluorenyl) titanium dichloride, monophenylmonomethylmethylene (cyclopentadienyl) (octamethyloctahydrodibenzofluorenyl) zirconium dichloride, diphenylmethylene (cyclopentadienyl) (octamethyloctahydrodibenzofluorenyl) zirconium dichloride, di(p-tolyl) methylene (cyclopentadienyl) (octamethyloctahydrodibenzofluorenyl) zirconium dichloride, monophenylmonomethylmethylene (cyclopentadienyl) (octamethyltetrahydrodicyclopentafluorenyl) zirconium dichloride, diphenylmethylene (cyclopentadienyl) (octamethyltetrahydrodicyclopentafluorenyl) zirconium dichloride, di(p-tolyl) methylene (cyclopentadienyl) (octamethyltetrahydrodicyclopentafluorenyl) zirconium dichloride, monophenylmonomethylmethylene (cyclopentadienyl) (dibenzofluorenyl) zirconium dichloride, diphenylmethylene (cyclopentadienyl) (dibenzofluorenyl) zirconium dichloride, di(p-tolyl) methylene (cyclopentadienyl) (dibenzofluorenyl) zirconium dichloride, monophenylmonomethylmethylene (cyclopentadienyl) (octamethyloctahydrodibenzofluorenyl) hafnium dichloride, diphenylmethylene (cyclopentadienyl) (octamethyloctahydrodibenzofluorenyl) hafnium dichloride, di(p-tolyl) methylene (cyclopentadienyl) (octamethyloctahydrodibenzofluorenyl) hafnium dichloride, monophenylmonomethylmethylene (cyclopentadienyl) (octamethyltetrahydrodibenzofluorenyl) titanium dichloride, diphenylmethylene (cyclopentadienyl) (octamethyloctahydrodibenzofluorenyl) titanium dichloride, di(p-tolyl) methylene (cyclopentadienyl) (octamethyloctahydrodibenzofluorenyl) titanium dichloride, di(p-tolyl) methylene (cyclopentadienyl) (fluorenyl) zirconium dichloride, di(p-tolyl) methylene (cyclopentadienyl) (2,7-dimethylfluorenyl) zirconium dichloride, di(p-tert-butylphenyl) methylene (cyclopentadienyl) (fluorenyl) zirconium dichloride, di(p-tert-butylphenyl) methylene (cyclopentadienyl) (2,7-di-t-butylfluorenyl) zirconium dichloride, di(p-tert-butylphenyl) methylene (cyclopentadienyl) (2,7-dimethylfluorenyl) zirconium dichloride, di(p-tert-butylphenyl) methylene (cyclopentadienyl) (3,6-di-tert-butylfluorenyl) zirconium dichloride, di(p-n-butylphenyl) methylene (cyclopentadienyl) (fluorenyl) zirconium dichloride, di(p-n-butylphenyl) methylene (cyclopentadienyl) (2,7-di-tert-butylfluorenyl) zirconium dichloride, di(p-n-butylphenyl) methylene (cyclopentadienyl) (2,7-dimethylfluorenyl) zirconium dichloride, di(p-n-butylphenyl) methylene (cyclopentadienyl) (3,6-di-tert-butylfluorenyl) zirconium dichloride, di(m-tolyl) methylene (cyclopentadienyl) (fluorenyl) zirconium dichloride, di(m-tolyl) methylene (cyclopentadienyl) (2,7-di-tert-butylfluorenyl) zirconium dichloride, di(m-tolyl) methylene (cyclopentadienyl) (2,7-dimethylfluorenyl) zirconium dichloride, di(m-tolyl) methylene (cyclopentadienyl) (3,6-di-tert-butylfluorenyl) zirconium dichloride, (p-tolyl) (phenyl) methylene (cyclopentadienyl) (fluorenyl) zirconium dichloride, di(p-isopropylphenyl) methylene (cyclopentadienyl) (fluorenyl) zirconium dichloride, di(p-tert-butylphenyl) methylene (cyclopentadienyl) (fluorenyl) zirconiumdichloride, di(p-tolyl)methylene(cyclopentadienyl) (fluorenyl)zirconium dimethyl, (p-tolyl) (phenyl) methylene (cyclopentadienyl) (octamethyloctahydrodibenzofluorenyl) zirconium dichloride, di(p-isopropylphenyl) methylene (cyclopentadienyl) (octamethyloctahydrodibenzofluorenyl) zirconium dichloride, di(p-tert-butylphenyl) methylene (cyclopentadienyl). (octamethyloctahydrodibenzofluorenyl) zirconium dichloride, di(p-tolyl) methylene (cyclopentadienyl) (octamethyloctahydrodibenzofluorenyl) zirconium dimethyl, di(p-tolyl) methylene (cyclopentadienyl) (octamethyloctahydrodibenzofluorenyl) zirconium dichloride, (p-tolyl) (phenyl) methylene (cyclopentadienyl) (2,7-di-tert-butylfluorenyl) zirconium dichloride, di(p-isopropylphenyl) methylene (cyclopentadienyl) (2,7-di-tert-butylfluorenyl) zirconium dichloride, di(p-tert-butylphenyl) methylene (cyclopentadienyl) (2,7-di-tert-butylfluorenyl) zirconium dichloride, di(p- tolyl) methylene (cyclopentadienyl) (2,7-di-tert-butylfluorenyl) zirconium dimethyl, (p-tolyl) (phenyl) methylene (cyclopentadienyl) (3,6-di-tert-butylfluorenyl) zirconium dichloride, di(p-isopropylphenyl) methylene (cyclopentadienyl) (3,6-di-tert-butylfluorenyl) zirconium dichloride, di(p-tert-butylphenyl) methylene (cyclopentadienyl) (3,6-di-tert-butylfluorenyl) zirconium dichloride, di(p-tolyl) methylene (cyclopentadienyl) (3,6-di-tert-butylfluorenyl) zirconium dimethyl, (p-tert-butylphenyl) (phenyl) methylene (cyclopentadienyl) (fluorenyl) zirconium dichloride, (p-tert-butylphenyl) (phenyl) methylene (cyclopentadienyl) (2,7-di-tert-butylfluorenyl) zirconium dichloride, (p-tert-butylphenyl) (phenyl) methylene (cyclopentadienyl) (2,7-dimethylfluorenyl) zirconium dichloride, (p-tert-butylphenyl) (phenyl) methylene (cyclopentadienyl) (3,6-di-tert-butylfluorenyl) zirconium dichloride, (p-n-ethylphenyl) (phenyl) methylene (cyclopentadienyl) (fluorenyl) zirconium dichloride, (p-n-ethylphenyl) (phenyl) methylene (cyclopentadienyl) (2,7-di-tert-butylfluorenyl) zirconium dichloride, (p-n-ethylphenyl) (phenyl) methylene (cyclopentadienyl) (2,7-dimethylfluorenyl) zirconium dichloride, (p-n-ethylphenyl) (phenyl) methylene (cyclopentadienyl) (3,6-di-tert-butylfluorenyl) zirconium dichloride, (4-biphenyl) (phenyl) methylene (cyclopentadienyl) (fluorenyl) zirconium dichloride, (4-biphenyl) (phenyl) methylene (cyclopentadienyl) (2,7-di-tert-butylfluorenyl) zirconium dichloride, (4-biphenyl) (phenyl) methylene (cyclopentadienyl) (2,7-dimethylfluorenyl) zirconium dichloride, (4-biphenyl) (phenyl) methylene (cyclopentadienyl) (3,6-di-tert-butylfluorenyl) zirconium dichloride, di(4-biphenyl) methylene (cyclopentadienyl) (fluorenyl) zirconium dichloride, di(4-biphenyl) methylene (cyclopentadienyl) (2,7-di-tert-butylfluorenyl) zirconium dichloride, di(4-biphenyl) methylene (cyclopentadienyl) (2,7-dimethylfluorenyl) zirdonium dichloride, di(4-biphenyl) methylene (cyclopentadienyl) (3,6-di-t-butylfluorenyl) zirconium dichloride, or compounds derived from the above compounds by changing their "cyclopentadienyl" into "(3-tert-butyl-5-methyl-cyclopentadienyl)" or "(3,5-dimethyl-cyclopentadienyl)", or by changing their zirconium into hafnium, titanium etc.

However, the crosslinked metallocene compound of the present invention is not limited to the exemplary compounds shown above, and encompasses all compounds satisfying the requirements of the general formula [II].

The crosslinked metallocene compound represented by the general formula [II] in the present invention can be produced by known methods, and the production process is not particularly limited. The known production process includes a method in WO01/27174 filed by the present applicant.

In the present invention, the ethylene-based polymer of the present invention can also be produced by using the group 4 transition metal compound (A2') containing a cyclopentadienyl skeleton as a ligand, besides the group 4 transition metal compound represented by the general formula [II]. The transition metal compound (A2') is not particularly limited, and the metallocene compound preferably used includes., for example, bis(methylcyclopentadienyl) zirconium dichloride, bis(dimethylcyclopentadienyl) zirconium dichloride, bis (dimethylcyclopentadienyl) zirconium ethoxychloride,: bis. (dimethylcyclopentadienyl) zirconium bis(trifluoromethanesulfonato), bis(ethylcyclopentadienyl) zirconium dichloride, bis(protylcyclopentadienyl) zirconium dichloride, bis(methylpropylcyclopentadienyl) zirconium dichloride, bis (butylcyclopentadienyl) zirconium dichioride, bis(methylbutylcyclopentadienyl) zirconium dichloride, bis (methylbutylcyclopentadienyl) zirconium. bis (trifluoromethanesulfonato), bis(trimethylcyclopentadienyl) zirconium dichloride, bis(tetramethylcyclopentadienyl) zirconium dichloride, bis(pentamethylcyclopentadienyl) zirconium dichloride, bis(hexylcyclopentadienyl) zirconium dichloride, bis(trimethylsilylcyclopentadienyl) zirconium dichloride., etc.

The metallocene compound (A2') is preferably a group 4 transition metal compound containing two cyclopentadienyl skeletons as the ligand wherein the two cyclopentadienyl skeletons are bound to each other via the group 14 atom, more preferably a metallocene compound (A2") with a chiral structure having C2 symmetry. Preferable examples of the metallocene compound (A2") with a chiral structure having C2 symmetry include rac-ethylene-bis(indenyl) zirconium dichloride, rac-ethylene-bis(tetrahydroindenyl) zirconium dichloride, rac-dimethylsilylene-bis(2,3,5-trimethylcyclopentadienyl) zirconium dichloride, rac-dimethylsilylene-bis [1-(4-phenylindenyl)] zirconium dichloride, rac-dimethylsilylene-bis[1-(2-methyl-4-phenylindenyl)] zirconium dichloride, rac-dimethylsilylene-bis{1-[2-methyl-4-(1-naphthyl)indenyl]} zirconium dichloride, rac-dimethylsilylene-bis{1-[2-methyl-4-(2-naphthyl)indenyl]} zirconium dichloride, rac-dimethylsilylene-bis{1-[2-methyl-4-(1-anthryl)indenyl]} zirconium dichloride, rac-dimethylsilylene-bis{1-[2-methyl-4-(9-anthryl)indenyl]} zirconium dichloride, rac-dimethylsilylene-bis{1-[2-methyl-4-(9-phenanthryl)inden yl]} zirconium dichloride, rac-dimethylsilylene-bis{1-[2-methyl-4-(o-chlorophenyl)inde nyl]} zirconium dichloride, rac-dimethylsilylene-bis{1-[2-methyl-4-(pentafluorophenyl)indenyl]} zirconium dichloride, rac-dimethylsilylene-bis[1-(2-ethyl-4-phenylindenyl)] zirconium dichloride, rac-dimethylsilyl-bis{1-[2-ethyl-4-(1-naphthyl)indenyl]} zirconium dichloride, rac-dimethylsilylene-bis{1-[2-ethyl-4-(9-phenanthryl)indenyl]} zirconium dichloride, rac-dimethylsilylene-bis[1-(2-n-propyl-4-phenylindenyl)] zirconium dichloride, rac-dimethylsilylene-bis{1-[2-n-propyl-4-(1-naphthyl)indenyl]} zirconium dichloride, rac-dimethylsilylene-bis{1-[2-n-propyl-4-(9-phenanthryl)indenyl]} zirconium dichloride, etc.

As the group 4 transition metal compounds (A2) and (A2'), two or more different kinds of compounds can also be used.

Together with (A1) a group 4 transition metal compound represented by the general formula [I] and (A2) a group 4 transition metal compound represented by the general formula [III], in the polymerization catalyst according to the present invention, compounds described in the present applicant's Japanese Patent Application Laid-Open No. 11-315109 and EP0874005A1 can be used without limitation as at least one compound selected from (b-1) an organometallic compound, (b-2) an organoaluminum oxy compound, and (b-3) a compound reacting with the transition metal compound (A1) or (A2) to form an ion pair.

The organometallic compound (b-1) is preferably an organoaluminum compound, and one or more kinds thereof can be used in combination. The organoaluminum oxy compound (b-2) is preferably aluminoxane prepared from trialkyl aluminum or tricycloalkyl aluminum, more preferably an organoaluminum oxy compound prepared from trimethyl aluminum or triisobutyl aluminum. Such organoaluminum oxy compounds are used alone or as a mixture of two or more thereof. Lewis acid, ionic compounds, borane compounds and carborane compounds described in Japanese Patent Application Laid-Open No. 1-1501950, Japanese Patent Application Laid-Open No.1-502036, Japanese Patent Application Laid-Open No. 3-179005, Japanese Patent Application Laid-Open No.3-179006, Japanese Patent Application Laid-Open No. 3-207703, Japanese Patent Application Laid-Open No. 3-207704 and U.S. Pat. No. 5,321,106, and further heteropoly compounds and isopoly compounds can be used without limitation as the compound (b-3) which reacts with the transition metal compound (A1) or (A2) to form an ion pair.

When the transition metal compound according to the present invention is used as a catalyst, an organoaluminum oxy compound (b-2) such as methyl aluminoxane can be simultaneously used as a co-catalyst component to exhibit very high polymerization activity on an olefin compound. An ionized ionic compound (b-3) such as triphenyl carbonium tetrakis (pentafluorophenyl) borate can be used as a co-catalyst component to produce, with good activity, an olefin polymer having a very high molecular weight.

In the olefin polymerization catalyst according to the present invention, the group 4 transition metal compounds (A1) and (A2), and (B) at least one compound selected from (b-1) an organometallic compound, (b-2) an organoaluminum oxy compound, and (b-3) a compound reacting with the transition metal compounds (A1) and (A2) to form an ion pair, are carried on a solid carrier (C) described below.

(C) Solid Carrier

The solid carrier (C) used in the present invention is an inorganic or organic compound in the form of granular or particulate solid.

The inorganic compound is preferably a porous oxide, inorganic chloride, clay, clay mineral, or ion-exchangeable layered compound.

Specific examples of the porous oxide used include $SiO_2$, $Al_2O_3$, MgO, ZrO, $TiO_2$, $B_2O_3$, CaO, ZnO, BaO and $ThO_2$ or complexes or mixtures containing them, for example natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among these, those based on $SiO_2$ and/or $Al_2O_3$ are preferable.

The above inorganic oxide may contain a small amount of carbonates, sulfates, nitrates and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ etc.

Although the properties of such porous oxides are varied depending on the type and process thereof, the particle diameter of the carrier used preferably in the present invention is 0.2 to 300 µm, preferably 1 to 200 µm, the specific surface area thereof is 50 to 1200 m²/g, preferably 100 to 1000 m²/g, and the void volume thereof is desirably in the range of 0.3 to 30 cm³/g. The carrier is used if necessary after baking at a temperature of 100 to 1000° C., preferably 150 to 700° C.

As the inorganic chloride, $MgCl_2$, $MgBr_2$, $MnCl_2$, $MnBr_2$ etc. are used. The inorganic chloride may be used as it is or may be used after milling with a ball mill, a vibration mill or the like. Fine particles of the inorganic chloride obtained by dissolving the inorganic chloride in a solvent such as alcohol and then precipitating it with a precipitator can also be used.

The clay used in the present invention is composed usually of clay mineral as a major component. The ion-exchangeable layered compound used in the present invention is a compound having a crystal structure in which faces constituted by ionic bonding etc. are layered in parallel by weak bonding force, and ions contained therein are exchangeable with one another. A majority of clay minerals are ion-exchangeable layered compounds. These clays, clay minerals and ion-exchangeable layered compounds are not limited to natural products, and artificially synthesized products can also be used.

The clays, clay minerals or ion-exchangeable layered compounds can be exemplified by clays, clay minerals, and ionic crystalline compounds having a layered crystal structure of hexagonal close packing type, antimony type, $CdCl_2$ type or $CdI_2$ type.

Such clays and clay mineral include kaolin, bentonite, kibushi clay, gairome clay, allophane, hisingerite, pyrophyllite, mica group, montmorillonite group, vermiculite, chlorite group, palygorskite, kaolinite, nacrite, dickite, halochite etc., and the ion-exchangeable layered compounds include crystalline acidic salts of multivalent metals, such as α-Zr$(HAsO_4)_2 \cdot H_2O$, α-Zr$(HPO_4)_2$, α-Zr$(KPO_4)_2 \cdot 3H_2O$, α-Ti $(HPO_4)_2$, α-Ti$(HAsO_4)_2 \cdot H_2O$, α-Sn$(HPO_4)_2 \cdot H_2O$, γ-Zr $(HPO_4)_2$, γ-Ti$(HPO_4)_2$, γ-Ti $(NH_4PO_4)_2 \cdot H_2O$ etc.

Such clays, clay minerals or ion-exchangeable layered compounds are those in which the volume of voids having a radius of 20 Å or more is preferably 0.1 cc/g or more, more preferably 0.3 to 5 cc/g. The void volume measured herein is the volume of voids having a radius in the range of 20 to 3×10⁴ Å by porosimetry using a mercury porosimeter.

When a material in which the volume of voids having a radius of 20 Å or more is less than 0.1 cc/g is used as a carrier, high polymerization activity tends to be hardly obtained.

The clays and clay minerals used in the present invention are preferably subjected to chemical treatment. As chemical treatment, any treatment such as surface treatment for removing impurities adhering to a surface and treatment for giving an influence to a crystal structure of clay can be used. Specifically, the chemical treatment includes acid treatment, alkali treatment, salt treatment, organic material treatment etc. The acid treatment not only removes impurities from a surface, but also increases surface area by eluting cations such as Al, Fe, Mg etc. in a crystal structure. The alkali treatment brings about a change in a clay structure by destroying a crystal structure of clay. By the salt treatment or organic substance treatment, a surface area and a distance between layers can be changed by forming an ion complex, a molecular complex, an organic derivative etc.

The ion-exchangeable layered compound used in the present invention may be a layered compound in such a state that the distance between layers is increased by exchanging exchangeable ions between the layers with other larger bulky ions by utilizing its ion exchangeability. Such bulky ions play a role as a pillar for supporting the layered structure, and is usually called a pillar. Such introduction of other substances into between layers in the layered compound is called intercalation. A guest compound subjected to intercalation includes cationic inorganic compounds such as $TiCl_4$ and $ZrCl_4$, metal alkoxides such as $Ti(OR)_4$, $Zr(OR)_4$, $PO(OR)_3$ and $B(OR)_3$ (where R is a hydrocarbon group or the like), and metal hydroxide ions such as $[Al_{13}O_4(OH)_{24}]^{7+}$, $[Zr_4(OH)_{14}]^{2+}$ and $[Fe_3O(OCOCH_3)_6]^+$. These compounds are used alone or as a mixture of two or more thereof. For intercalation of these compounds, polymeric products obtained by hydrolyzing metal alkoxides such as Si $(OR)_4$, $Al(OR)_3$ and Ge $(OR)_4$ (where R is a hydrocarbon group or the like) or colloidal inorganic compounds such as $SiO_2$ can be coexistent. The pillar includes oxides formed by thermal dehydration after intercalation of the metal hydroxide ions into between layers.

The clays, clay minerals and ion-exchangeable layered compounds used in the present invention may be used as such, or may be used after treatment by a ball mill, sifting etc. These materials may be used after addition and adsorption of new water or after thermal dehydration treatment. These materials may be used alone or as a mixture of two or more thereof.

Among these materials, clays or clay minerals are preferable, among which montmorillonite, vermiculite, pectolite, taeniolite and synthetic mica are particularly preferable.

The organic compound includes granular or particulate solids having a particle diameter in the range of 10 to 300 μm. Specific examples include (co)polymers formed from C2 to C14 olefins such as ethylene, propylene, 1-butene and 4-methyl-1-pentene as major components, (co)polymers formed from vinyl cyclohexane and styrene as major components, and modified products thereof.

The olefin polymerization catalyst according to the present invention can, if necessary, contain a specific organic compound component (D) together with the transition metal compounds (A1) and (A2) and at least one compound (B) selected from (b-1) an organometallic compound, (b-2) an organoaluminum oxy compound and (b-3) an ionized ionic compound. As the organic compound component, compounds described in Japanese Patent Application Laid-Open No. 11-315109 and EP0874005A1, both of which were filed by the present applicant, can be used without limitation.

In polymerization, the method of using the respective components and the order of adding them are arbitrarily selected, and can be exemplified by the following methods:

[1] a method wherein the catalyst component having the components (A1) and (B) carried on the carrier (C), and the catalyst component having the components (A2) and (B) carried on the carrier (C), are added in an arbitrary order to a polymerizer, and

[2] a method wherein the catalyst component having the components (A1), (A2) and (B) carried on the carrier (C) is added to a polymerizer.

In the method described in the above-mentioned [1], at least two of the respective catalyst components may be previously contacted with one another.

The respective methods in the above-mentioned [1] and [2] wherein the component (B) is carried, the component (B) not carried if necessary may be added in an arbitrary order. In this case, the component (B) may be the same or different.

The solid catalyst component having the components (A1), (A2) and (B) carried on the carrier (C) in the above-mentioned [1] and [2] may be preliminarily polymerized with an olefin, and the catalyst component may be carried on the preliminarily polymerized solid catalyst component.

Carrying the components (A1) and (B) onto the carrier (C) or carrying the components (A2) and (B) on the carrier (C) in the above-mentioned [1] can be easily conducted according to a known method. Carrying the components (A1), (A2) and (B) on the carrier (C) in the above-mentioned [2] is conducted preferably in the following manner.

One method is a method in which the components (A1) and (A2) are preliminarily contacted with each other and then contacted with the carrier (C) having the component (B) carried thereon, and another method is a method in which the component (A1) [or the component (A2)] is first contacted with the carrier (C) having the component (B) carried thereon and then the component (A2) [or the component (A1)] is contacted with the above carrier (C) having the component (A1) [or the component (A2)] and the component (B) carried thereon. The former method, that is, a method in which the components (A1) and (A2) are preliminarily contacted with each other and then contacted with the carrier (C) having the component (B) carried thereon, is particularly preferable.

Specifically, the components (A1) and (A2) are dissolved in an arbitrary ratio in an inert hydrocarbon solvent and then contacted in an inert hydrocarbon solvent with the carrier (C) having the component (B) carried thereon, to carry the components (A1), (A2) and (B) on the carrier (C).

The inert hydrocarbon solvent used in carrying the components includes, for example, aliphatic hydrocarbons such as propane, butane, pentane, hexane, heptane, octane, decane, dodecane and kerosine, alicyclic hydrocarbons such as cyclopentane, cyclohexane and methyl cyclopentane, aromatic hydrocarbons such as benzene, toluene and xylene, halogenated hydrocarbons such as ethylene chloride, chlorobenzene and dichloromethane, or mixtures thereof. The preliminary contact time of component (A1) with component (A2) is usually 0 to 5 hours, preferably 0 to 1 hour, more preferably 0 to 20 minutes, and thereafter, the time of contacting them with the carrier (C) having the component (B) carried thereon is usually 0 to 24 hours, preferably 0 to 5 hours, more preferably 0 to 2 hours. These carrying procedures are conducted usually at −50 to 200° C., preferably −50 to 50° C., more preferably 0 to 40° C. The components (A1) and (A2) can be arbitrarily determined depending on the molecular weight and molecular weight distribution of polyolefin desired to be produced, and the molar ratio [(A1)/(A2)] of the component (A1) to the component (A2) can be determined from the olefin polymerization activities of the components (A1) and (A2) respectively. [(A1)/(A2)] is usually 0.03 to 30, preferably 0.06 to 15.

The total transition metal atom (M) in the components (A1) and (A2) carried on the carrier (C) can be determined by inductively coupled plasma-emission spectrometry (ICP analysis).

The component (b-1) is used in such an amount that the molar ratio [(b-1)/M] of the component (b-1) to the total transition metal atom (M) in the components (A1) and (A2) becomes usually 0.01 to 100000, preferably 0.05 to 50000. The component (b-2) is used in such an amount that the molar ratio [(b-2)/M] of aluminum atom in the component (b-2) to the total transition metal atom (M) in the components (A1) and (A2) becomes usually 10 to 500000, preferably 20 to 100000. The component (b-3) is used in such an amount that the molar ratio [(b-3)/M] of the component (b-3) to the total transition metal atom (M) in the components (A1) and (A2) becomes usually 1 to 10, preferably 1 to 5.

When the component (B) is the component (b-1), the component (D) is used in such an amount that the molar ratio [(D)/(b-1)] becomes usually 0.01 to 10, preferably 0.1 to 5; when the component (B) is the component (b-2), the component (D) is used in such an amount that the molar ratio [(D)/(b-2)] becomes usually 0.001 to 2, preferably 0.005 to 1; and when the component (B) is the component (b-3), the component (D) is used in such an amount that the molar ratio [(D)/(b-3)] becomes usually 0.01 to 10, preferably 0.1 to 5.

In the olefin polymerization method according to the present invention, an olefin polymer is obtained by polymerizing or copolymerizing olefins in the presence of the polymerization catalyst described above.

The polymerization in the present invention can be carried out by liquid-phase polymerization such as solution polymerization or suspension polymerization or by gaseous-phase polymerization.

Examples of inert hydrocarbon solvents used in the liquid-phase polymerization include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, or mixtures thereof, and olefins themselves can also be used as the solvent.

When the olefin polymerization catalyst described above is used in polymerization of olefins, the components (A1) and (A2) are used usually in an amount of $10^{-12}$ to $10^{-1}$ mole, preferably $10^{-8}$ to $10^{-2}$ mole, per liter of there action volume, and if necessary, the specific organic compound component (D) can be contained.

The temperature at which an olefin is polymerized by the olefin polymerization catalyst is usually in the range of −50 to +200° C., preferably 0 to +170° C., more preferably +60 to +170° C. The polymerization pressure is usually normal pressures to 100 kg/cm², preferably normal pressures to 50 kg/cm², and the polymerization reaction can be carried out in a batch, semi-continuous or continuous system. Further, polymerization can be carried out in two or more stages different in reaction conditions.

The molecular weight of the obtained olefin polymer can be regulated by allowing hydrogen to be present in the polymerization system or by changing the polymerization temperature. Further, the molecular weight can be regulated by difference in the component (B) used.

The olefin which can be polymerized by the olefin polymerization catalyst is as described above, and if necessary, it is possible to simultaneously use C3 to C30, preferably C5 to C20, cyclic olefins such as cyclopentene, cyclohepene, norbornene, 5-methyl-2-norbornene, tetracyclododecene, etc.; polar monomers such as acrylic acid, methacrylic acid, fumaric acid, maleic anhydride, etc.; α,β-unsaturated carboxylate esters such as methyl acrylate, ethyl acrylate, methyl methacrylate, ethyl methacrylate, methacrylic acid, etc.; vinyl esters such as vinyl acetate, vinyl propionate, etc.; unsaturated glycidyl such as glycidyl acrylate, glycidyl methacrylate, etc.; and halogenated olefins such as vinyl fluoride, vinyl chloride, etc.

As the olefin, vinyl cyclohexane, diene, polyene etc. can also be used. As the olefin, an aromatic vinyl compound such as styrene etc. and a functional group-containing styrene derivative such as divinyl benzene etc. can also be simultaneously used.

The ethylene-based polymer particles thus obtained may be formed into pellets by the following methods.

(1) A method wherein the ethylene-based polymer particles and other components added if necessary are blended mechanically by using an extruder, a kneader or the like and then cut into pieces of predetermined size.

(2) A method wherein the ethylene-based polymer and other components added if necessary are dissolved in a suitable good solvent (for example, a hydrocarbon solvent such as hexane, heptane, decane, cyclohexane, benzene, toluene and xylene) followed by removing the solvent, and subsequently the residues are mechanically blended by an extruder, a kneader or the like and cut into pieces of predetermined size.

The ethylene-based polymer according to the present invention can be compounded if necessary with additives such as a weather ability stabilizer, a heat stabilizer, an antistatic agent, a slip inhibitor, an anti-blocking agent, a haze inhibitor, a lubricant, a dye, a nucleating agent, a plasticizer, an aging inhibitor, an HCl absorber and an antioxidant and a pigment such as carbon black, titanium oxide, titanium yellow, phthalocyanine, isoindoline, a quinacridone compound, a condensed azo compound, ultramarine, cobalt blue etc. in such a range that the object of the present invention is not hindered.

The ethylene-based polymer according to the present invention can be formed into a blow-molded product, an inflation-molded product, a casting-molded product, an extrusion-laminated molded product, an extrusion-molded product such as a pipe or a special shape, a foam-molded product, an injection-molded product. The ethylene-based polymer can also be used in fibers, monofilaments, and non-woven fabrics. These molded products include molded products (laminates etc.) containing a part consisting of the ethylene-based polymer and a part consisting of another resin. The ethylene-based polymer may be the one crosslinked in the molding process. To give excellent properties, the ethylene-based polymer according to the present invention can be preferably used in a blow-molded product or in an extrusion-molded product such as a pipe or a special shape, among the molded products described above.

The ethylene-based polymer of the present invention can be formed by blow molding into a bottle container, an industrial chemical can, a gasoline tank etc. These molded products include molded products (laminates etc.) containing a part consisting of the ethylene-based polymer and a part consisting of another resin. Alternatively, a single layer of the ethylene-based polymer can be formed into a molded product.

A general bleaching agent represented by a chlorine-based bleaching agent, or a surfactant, can also be preferably used in the polymer solution.

The ethylene-based polymer of the present invention can be formed into a pipe or a pipe joint formed by injection molding. These molded products include molded products (laminates etc.) containing a part consisting of the ethylene-based polymer and a part consisting of another resin. Alternatively, a single layer of the ethylene-based polymer can be formed into a molded product.

These molded products can be colored with a coloring matter such as titanium oxide and phthalocyanine. The molded product conferred with functions by adding additives such as an antioxidant and an antistatic agent can be used.

Hereinafter, the present invention is described in more detail by reference to the Examples, but the present invention is not limited to the Examples.

In the Examples, the hexene content of the ethylene/hexene copolymer was determined by using FT-IR (SHIMAZU FTIR-8200D) The transition metal atom concentration and the Al concentration in the solid component and the solid catalyst component were determined by inductively coupled plasma-emission spectrometry (ICP analysis).

Intrinsic Viscosity ([η])

The intrinsic viscosity is a value measured at 135° C. in a decalin solvent. That is, about 20 mg granulated pellets are dissolved in 15 ml decalin and specific viscosity $\eta_{sp}$ measured in an oil bath at 135° C. This decalin solution is diluted with additional 5 ml decalin solvent, and then specific viscosity $\eta_{sp}$ is measured in the same manner as above. This diluting procedure is repeated further twice, and the value of $\eta_{sp}/C$ upon extrapolation of concentration (C) to 0 is determined as the intrinsic viscosity (see the following equation).

$$[\eta]=\lim(\eta_{sp}/C)\ (C\to 0)$$

Density (d)

A sheet of 0.5 mm in thickness (spacer shape; 9 sheets of 45×45×0.5 mm from a plate of 240×240×0.5 mm) was formed at a pressure of 100 kg/cm² with a hydraulic heat press machine set at 190° C. manufactured by Shinto Metal Industries, Ltd. and then cooled under compression at a pressure of 100 kg/cm² with another hydraulic heat press machine set at 20° C. manufactured by Shinto Metal Industries, Ltd., to prepare a measurement sample. As a hot plate, an SUS plate of 5 mm in thickness was used. This press sheet was heat-treated at 120° C. for 1 hour, then cooled gradually linearly over 1 hour to room temperature, and measured for density in a density gradient tube.

Weight-Average Molecular Weight (Mw), Number-Average Molecular Weight (Mn), and Polymer Blend Ratio (BR) of Low-Molecular Component to High-Molecular Component These were measured in the following manner by using GPC-150C manufactured by Waters. As columns for separation, TSK gel GMH6-HT and TSK gel GMH6-HTL were used, and their column sizes were 7.5 mm in inner diameter and 600 mm in length respectively, and the column temperature was 140° C., and o-dichlorobenzene (Wako Pure Chemical Industries, Ltd.) was used as the mobile phase and transferred at 1.0 ml/min. with 0.025 wt % BHT (Takeda Chemical Industries, Ltd.) as an antioxidant. The concentration of a sample was 0.1 wt %, and the volume of the sample injected was 500 μl, and a differential refractometer was used as the detector. Standard polystyrene having a molecular weight of Mw<1,000 and Mw>4×10$^6$ was a product of Tosoh Corporation, and standard polystyrene having a molecular weight of 1,000≦Mw≦4×10$^6$ was a product of Pressure Chemical. The molecular weight is a value determined using universal calibration with PE as the standard.

Separation of Molecular-Weight Curve

A program was prepared by using a visual basic of Excel (registered trademark) 97 manufactured by Microsoft. Curves to be separated were separated into 2 curves different in molecular weight with logarithmico-normal distribution by convergence calculation. A curve generated by re-synthesizing the 2 separated curves was compared with the molecular-weight curve obtained actually in GPC, and calculation was performed while the initial value was changed such that the two curves became almost identical. This calculation was performed with the log (molecular weight) divided at intervals of 0.02. The intensity was standardized such that the area of the actually obtained molecular weight curve and the area of the curve obtained by re-synthesizing the 2 separated curves became 1, and the calculation of curve separation was repeated until a value obtained by dividing, with the actually obtained intensity (height), the absolute value of a difference between the intensity (height) of the actually obtained molecular weight curve and the intensity (height) of the re-synthesized curve at each molecular weight became 0.4 or less, preferably 0.2 or less, more preferably 0.1 or less in the molecular-weight range of 10,000 to 1,000,000, and became 0.2 or less, preferably 0.1 or less, in the maximum position of two separated peaks. The difference between the Mw/Mn of a peak separated at the low-molecular weight side and the Mw/Mn of a peak separated at the high-molecular weight side shall be 1.5 or less. The polymer blend ratio (BR) of the low-molecular component to the high molecular component was calculated according to the following equation:

$BR=S_L/S_H$ $S_L$: area at the low-molecular component side in GPC chart
$S_H$: area at the high-molecular component side in GPC chart Measurement of MFR Melt flow rate is measured in the following manner. That is, an orifice satisfying dimensions prescribed in JIS K7210 was fit in an automatic MFR measuring meter (manufactured by Tester Sangyo) manufactured according to JISK7210, and a barrel (sample inlet) was heated and kept at 190° C. 4 g sample was introduced into the barrel, and a piston was fit therein, bubbles were removed, and the sample was pre-heated for 6 minutes. After preheating, the sample was extruded under a loading of 2.16 kg or 21.6 kg, and the weight of the sample extruded per 10 minutes was calculated as melt flow rate.

Measurement of MT

Melt tension (MT) is determined by measuring the stress upon stretching a molten ethylene-based polymer at a constant speed. That is, the measurement was conducted using a MT measuring machine manufactured by Toyo Seiki Seisaku-sho, Ltd., under conditions where the resin temperature was 190° C., the extrusion speed was 15 mm/min., the take-up speed was 7.85 m/min., the nozzle diameter was 2.09 mmφ, and the nozzle length was 8 mm.

Measurement of Swell Ratio

Swell ratio is measured in the following manner. That is, a nozzle having a nozzle diameter ($D_0$) of 3.0 mmφ and a length (L) of 3 mm was fit in Capillograph-IB manufactured by Toyo Seiki Seisaku-sho, Ltd., and a barrel (sample inlet) was heated and kept at 190° C. About 10 g sample was introduced into the barrel, and a piston was fit therein, bubbles were removed, and the sample was pre-heated for 6 minutes. After preheating, the sample was extruded at each of shear speeds of 0.25, 0.5, 1, 2.5, 5, 10 and 25 sec$^{-1}$, and the strand diameter (Di) below 15 mm apart from an nozzle outlet was measured by a laser light. The ratio of the thus measured strand diameter ($D_i$) to the nozzle diameter ($D_0$) [$SR_i=D_i/D_0$] is determined.

From a curve obtained by plotting $SR_i$ against each shear speed on a semi-logarithmic section paper, a value at a shear speed of 9.98 sec$^{-1}$ is read as swell ratio.

Measurement of Activation Energy of Fluidization (Ea)

Ea is measured in the following manner. That is, measurement of melt viscoelasity is conducted in the measurement frequency range of 0.1 rad/sec to 100 rad/sec at each of temperatures of 150° C., 190° C. and 230° C. in a nitrogen atmosphere by using a stress rheometer SR-5000 manufactured by TA Instrument. As a jig for giving shearing to resin, a parallel plate of 25 mm in diameter is used. From a fluidization curve obtained at each temperature, a master curve with 190° C. as a standard temperature is prepared, and from the temperature dependence of its shift factor $a_T$, Ea is calculated according to the Arrhenius' equation: log $a_T$=(Ea/2.303R) [(1/T)−(1/$T_0$)] (R, gas constant; T, absolute temperature; $T_0$, standard temperature).

The group 4 transition metal compounds (A1) and (A2) used in the Examples and Comparative Examples were synthesized by the method described above.

[Preparation of Solid Component (E)]

30 g silica (manufactured by Asahi Glass Co., Ltd.) dried at 150° C. for 5 hours in a nitrogen stream was suspended in 466 ml toluene, and then 134.3 ml solution of methyl alumoxane (308 mmol/ml in terms of Al atom) in toluene was added dropwise at 25° C. to the suspension over 30 minutes. Thereafter, the mixture was heated to 114° C. over 30 minutes and reacted at this temperature for 4 hours. Thereafter, the temperature of the reaction mixture was decreased to 60° C., and the supernatant was removed by decantation. The solid component thus obtained was washed 3 times with toluene, and toluene was added thereto to prepare slurry of the solid component (E) in toluene. A part of the resulting solid component (E) was collected to examine its concentration, indicating that the slurry concentration was 0.1189 g/ml and the Al concentration was 0.8377 mmol/ml.

EXAMPLE 1

Preparation of solid catalyst component (F)

71.05 ml toluene was introduced into a 300-ml glass flask flushed previously with nitrogen, and then charged under stirring with 8.95 ml slurry of the solid component (E) in toluene (1.06 g in terms of solids content) prepared above. Then, 20.0 ml solution containing 0.0165 mmol compound (1) below and 0.0135 mmol compound (2) below was added there to dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (F) in heptane. A part of the resulting slurry of the solid catalyst component (F) in heptane was collected to examine its concentration, indicating that the Zr concentration was 0.000201 mmol/ml, and the Al concentration was 0.0615 mmol/ml.

Compound (1)

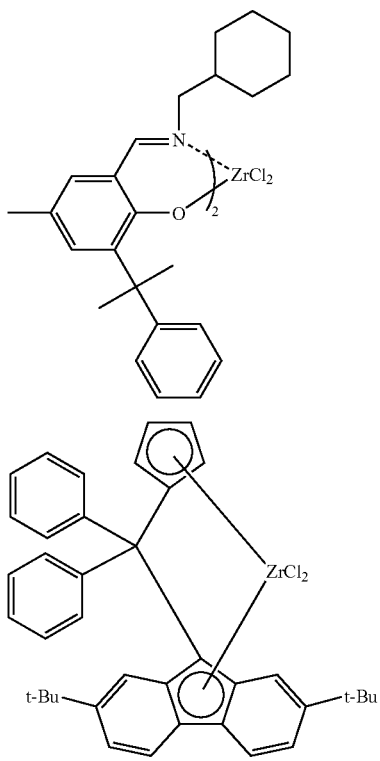

Compound (2)

Compound (3)

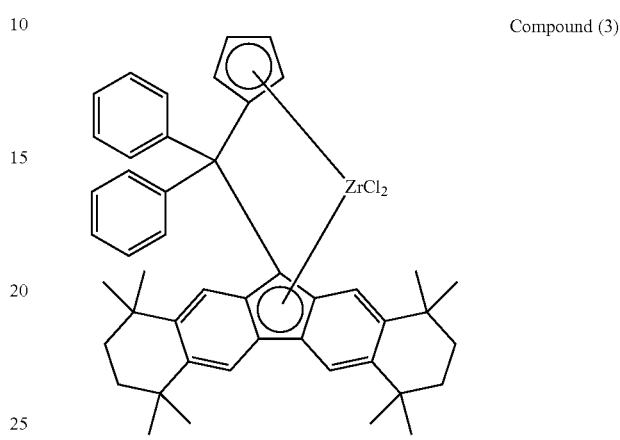

[Polymerization]

500 ml heptane was introduced into an SUS autoclave having an internal volume of 1 liter purged sufficiently with nitrogen, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.746 ml solid catalyst component (F) (0.00015 mmol in terms of zirconium atom) were added thereto, heated to 80° C. and subjected to polymerization for 3 hours while a mixed gas of ethylene/hydrogen (hydrogen concentration: 0.06 mol %) was supplied such that the total pressure became 8 kg/cm²-G. The polymerization was terminated by adding a small amount of methanol.

The resulting polymer was washed with hexane and then dried under reduced pressure at 80° C. for 10 hours. The amount of the resulting ethylene/1-hexene copolymer was 28.5 g, and the polymerization activity per 1 mmol zirconium was 190 kg/mmol. The hexene content was 0.48 mol %., the [η] value thereof was 3.54 dl/g, and the Mw, Mw/Mn, and BR thereof were 235000, 15.25, and 53/47, respectively.

EXAMPLE 2

Preparation of Solid Catalyst Component (G)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.0128 mmol compound (1) used in Example 1 above and 0.0022 mmol compound (3) below was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (G) in heptane. A part of the resulting slurry of the solid catalyst component (G) in heptane was collected to examine its concentration, indicating that the Zr concentration was 0.000105 mmol/ml, and the Al concentration was 0.0328 mmol/ml.

[Polymerization]

500 ml n-heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.762 ml solid catalyst component (G) (0.00008 mmol in terms of zirconium atom) were added thereto, heated to 80° C. and subjected to polymerization for 3 hours while a mixed gas of ethylene/hydrogen (hydrogen concentration: 0.06 mol %) was supplied such that the total pressure became 8 kg/cm²-G. The polymerization was terminated by adding a small amount of methanol.

The resulting polymer was washed with hexane and then dried under reduced pressure at 80° C. for 10 hours. The amount of the resulting ethylene/1-hexene copolymer was 18.7 g, and the polymerization activity per 1 mmol zirconium was 234 kg/mmol. The hexene content was 0.32 mol %, the [η] value thereof was 3.39 dl/g, and the Mw, Mw/Mn, and BR thereof were 240000, 15.91, and 54/46, respectively.

EXAMPLE 3

Preparation of Solid Catalyst Component (H)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.0116 mmol compound (4) below and 0.0034. mmol compound (3) used in Example 2 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (H) in heptane. A part of the resulting slurry of the solid catalyst component (H) in heptane was collected to examine its concentration, indicating that the Zr concentration was 0.000110 mmol/ml, and the Al concentration was 0.0280 mmol/ml.

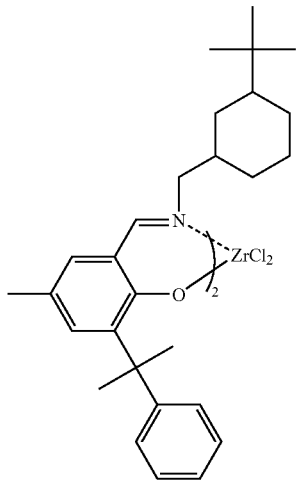

Compound (4)

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.455 ml solid catalyst component (H) (0.00005 mmol in terms of zirconium atom) were added thereto, heated to 80° C. and subjected to polymerization for 3 hours while a mixed gas of ethylene/hydrogen (hydrogen concentration: 0.06 mol %) was supplied such that the total pressure became 8 kg/cm²-G. The polymerization was terminated by adding a small amount of methanol.

The resulting polymer was washed with hexane and then dried under reduced pressure at 80° C. for 10 hours. The amount of the resulting ethylene/1-hexene copolymer was 22.6 g, and the polymerization activity per 1 mmol zirconium was 452 kg/mmol. The hexene content was 0.67 mol %, the [η] value thereof was 3.89 dl/g, and the Mw, Mw/Mn, and BR thereof were 207000, 18.64, and 56/44, respectively.

EXAMPLE 4

Preparation of Solid Catalyst Component (J)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.006 mmol compound (4) used in Example 3 above and 0.009 mmol compound (3) used in Example 2 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (J) in heptane. A part of the resulting slurry of the solid catalyst component (J) in heptane was collected to examine its concentration, indicating that the Zr concentration was 0.000121 mmol/ml, and the Al concentration was 0.0307 mmol/ml.

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.207 ml solid catalyst component (J) (0.000025 mmol in terms of zirconium atom) were added thereto, heated to 80° C. and subjected to polymerization for 3 hours while ethylene was supplied such that the total pressure became 8 kg/cm²-G. The polymerization was terminated by adding a small amount of methanol.

The resulting polymer was washed with hexane and then dried under reduced pressure at 80° C. for 10 hours. The amount of the resulting ethylene/1-hexene copolymer was 30.2 g, and the polymerization activity per 1 mmol zirconium was 1210 kg/mmol. The hexene content was 0.85 mol %, the [η] value thereof was 3.10 dl/g, and the Mw, Mw/Mn, and BR thereof were 337000, 12.39, and 41/59, respectively.

EXAMPLE 5

Preparation of Solid Catalyst Component (K)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.00975 mmol compound (5) below and 0.00525 mmol compound (3) used in Example 2 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (K) in heptane. A part of the resulting slurry of the solid catalyst component (K) in heptane was collected to examine its concentration, indicating that the Zr concentration was 0.000117 mmol/ml, and the Al concentration was 0.0321 mmol/ml.

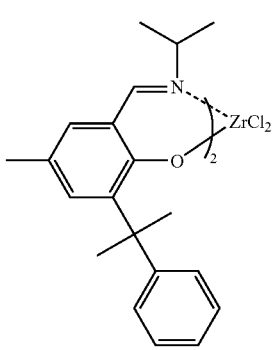

Compound (5)

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5mmol/ml in terms of aluminum atom), and 0.214 ml solid catalyst component (K) (0.000025 mmol in terms of zirconium atom)

were added thereto, heated to 80° C. and subjected to polymerization for 3 hours while a mixed gas of ethylene/hydrogen (hydrogen concentration: 0.06 mol %) was supplied such that the total pressure became 8 kg/cm$^2$-G. The polymerization was terminated by adding a small amount of methanol.

The resulting polymer was washed with hexane and then dried under reduced pressure at 80° C. for 10 hours. The amount of the resulting ethylene/hexene copolymer was 14.0 g, and the polymerization activity per 1 mmol zirconium was 560 kg/mmol. The hexene content was 0.60 mol %, the [η] value thereof was 4.01 dl/g, and the Mw, Mw/Mn, and BR thereof were 189000, 12.68, and 43/57, respectively.

EXAMPLE 6

Preparation of Solid Catalyst Component (L)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.0105 mmol compound (5) used in Example 5 above and 0.0045 mmol compound (6) below was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (L) in heptane. A part of the resulting slurry of the solid catalyst component (L) in heptane was collected to examine its concentration, indicating that the Zr concentration was 0.000120 mmol/ml, and the Al concentration was 0.0324 mmol/ml.

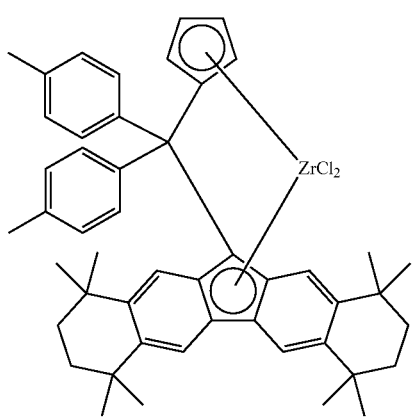

Compound (6)

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.208 ml solid catalyst component (L) (0.000025 mmol in terms of zirconium atom) were added thereto, heated to 80° C. and subjected to polymerization for 3 hours while a mixed gas of ethylene/hydrogen (hydrogen concentration: 0.06 mol %) was supplied such that the total pressure became 8 kg/cm$^2$-G. The polymerization was terminated by adding a small amount of methanol.

The resulting polymer was washed with hexane and then dried under reduced pressure at 80° C. for 10 hours. The amount of the resulting ethylene/hexene copolymer was 14.6 g, and the polymerization activity per 1 mmol zirconium was 584 kg/mmol. The hexene content was 0.55 mol %, the [η] value thereof was 4.34 dl/g, and the Mw, Mw/Mn, and B.R. thereof were 234000, 24.67, and 41/59, respectively.

EXAMPLE 7

Preparation of Solid Catalyst Component (M)

35.52 ml toluene was introduced into a 300-ml glass flask flushed previously with nitrogen, and then charged under stirring with 4.48 ml slurry of the solid component (E) in toluene (0.533 g in terms of solids content) prepared above. Then, 10.0 ml solution containing 0.0105 mmol compound (5) used in Example 5 above and 0.0045 mmol compound (7) below was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (M) in heptane. A part of the resulting slurry of the solid catalyst component (M) in heptane was collected to examine its concentration, indicating that the Zr concentration was 0.000125 mmol/ml, and the Al concentration was 0.0317 mmol/ml.

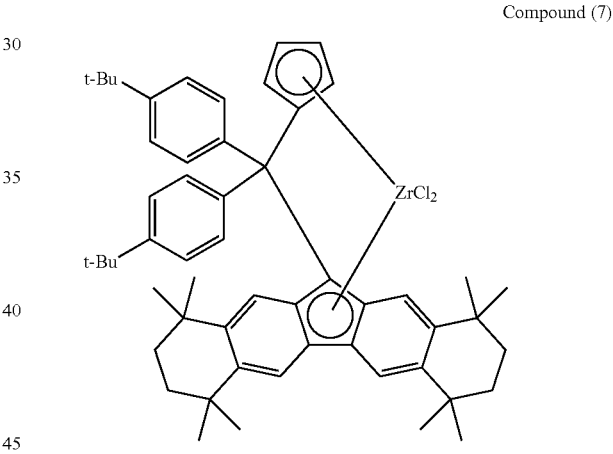

Compound (7)

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 3 ml 1-hexene, 1.0 ml solution of triisobutyl aluminum (manufactured by Tosoh Finechem Corporation) in heptane (0.5 mmol/ml in terms of aluminum atom), and 0.200 ml solid catalyst component (M) (0.000025 mmol in terms of zirconium atom) were added thereto, heated to 80° C. and subjected to polymerization for 3 hours while a mixed gas of ethylene/hydrogen (hydrogen concentration: 0.06 mol %) was supplied such that the total pressure became 8 kg/cm$^2$-G. The polymerization was terminated by adding a small amount of methanol.

The resulting polymer was washed with hexane and then dried under reduced pressure at 80° C. for 10 hours. The amount of the resulting ethylene/hexene copolymer was 16.0 g, and the polymerization activity per 1 mmol zirconium was 640 kg/mmol. The hexene content was 0.58 mol %, the [η] value thereof was 3.87 dl/g, and the Mw, Mw/Mn, and BR thereof were 264000, 29.06, and 45/55, respectively.

Comparative Example 1

Preparation of Solid Catalyst Component (N)

71.05 ml toluene was introduced into a 300-ml glass flask flushed previously with nitrogen, and then charged under stirring with 8.95 ml slurry of the solid component (E) in toluene (1.06 g in terms of solids content) prepared above. Then, 20.0 ml solution containing 0.03 mmol compound (1) used in Example 1 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (N) in heptane. A part of the resulting slurry of the solid catalyst component (N) in heptane was collected to examine its concentration, indicating that the Zr concentration was 0.000270 mmol/ml, and the Al concentration was 0.0689 mmol/ml.

[Polymerization]

500 ml heptane was introduced into an SUS autoclave having an internal volume of 1 liter purged sufficiently with nitrogen at room temperature, and the liquid phase and gaseous phase were saturated with ethylene. Thereafter, 0.5 ml solution of triisobutyl aluminum (manufactured by Tosoh Finechem Corporation) in heptane (0.5 mmol/ml in terms of aluminum atom) and 1.11 ml solid catalyst component (N) (0.003 mmol in terms of zirconium atom) were added thereto, heated to 80° C. and subjected to polymerization for 107 minutes while a mixed gas of ethylene/hydrogen (hydrogen concentration: 2.53 mol %) was supplied such that the total pressure became 8 kg/cm$^2$-G. After the polymerization, the mixed gas of ethylene/hydrogen used was removed by depressurization and subsequent introduction of nitrogen.

0.5 ml solution of triisobutyl aluminum (manufactured by Tosoh Finechem Corporation) in heptane (0.5 mmol/ml in terms of aluminum atom) and 5 ml 1-hexene were introduced into this 1-L SUS autoclave, followed by supplying a mixed gas of ethylene/hydrogen (hydrogen concentration: 0.0305 mol %) such that the total pressure became 8 kg/cm$^2$-G, and the mixture was polymerized again at 80° C. for 17 minutes. The polymerization was terminated by adding a small amount of methanol.

The resulting polymer was washed with hexane and then dried under reduced pressure at 80° C. for 10 hours. The amount of the resulting ethylene/hexene copolymer was 100.4 g, and the polymerization activity per 1 mmol zirconium was 33 kg/mmol. The hexene content was 0.67 mol %, the [η] value thereof was 4.11 dl/g, and the Mw, Mw/Mn, and BR thereof were 299000, 32.68, and 54/46, respectively.

EXAMPLE 8

Preparation of Solid Component (O)

30 g silica (manufactured by Asahi Glass Co., Ltd.) dried at 150° C. for 5 hours in a nitrogen stream was suspended in 400 ml toluene, and then 207.6 ml solution of methyl alumoxane (300 mmol/ml in terms of Al atom) in toluene was added dropwise at 25° C. to the suspension over 30 minutes. Thereafter, the mixture was heated to 114° C. over 30 minutes and reacted at this temperature for 4 hours. Thereafter, the temperature of the reaction mixture was decreased to 60° C., and the supernatant was removed by decantation. The solid component thus obtained was washed 3 times with toluene, and toluene was added thereto to prepare slurry of the solid component (O) in toluene. A part of the resulting solid component (O) was collected to examine its concentration, indicating that the slurry concentration was 0.08123 g/ml and the Al concentration was 0.7339 mmol/ml.

[Preparation of Solid Catalyst Component (P)]

35.0 ml toluene was introduced into a 300-ml glass flask flushed previously with nitrogen, and then charged under stirring with 5.11 ml slurry of the solid component (O) in toluene (0.415 g in terms of solids content) prepared above. Then, 20.0 ml toluene solution containing 0.0060 mmol compound (5) and 0.00909 mmol compound (6) used in Example 6 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (P) in heptane. A part of the resulting slurry of the solid catalyst component (P) in heptane was collected to examine its concentration, indicating that the Zr concentration was 0.000126mmol/ml, and the Al concentration was 0.0347 mmol/ml.

[Polymerization]

500 ml heptane was introduced into an SUS autoclave having an internal volume of 1 liter purged sufficiently with nitrogen, and the liquid phase and gaseous phase were saturated with a mixed gas of ethylene/hydrogen (hydrogen concentration: 0.101 mol %). Thereafter, 3 ml 1-hexene, 0.5 ml solution of triisobutyl aluminum (manufactured by Tosoh Finechem Corporation) in heptane (1.0 mmol/ml in terms of aluminum atom), and 0.59 ml solid catalyst component (P) (0.000075 mmol in terms of zirconium atom) were added thereto, heated to 65° C. and subjected to polymerization for 3 hours while a mixed gas of ethylene/hydrogen (hydrogen concentration: 0.101 mol %) was supplied such that the total pressure became 8 kg/cm$^2$-G. The polymerization was terminated by adding a small amount of methanol.

The resulting polymer was washed with hexane and then dried under reduced pressure at 80° C. for 10 hours. The yield, polymerization activity per 1 mmol zirconium, hexene content, [η], Mw, Mw/Mn, and polymer blend ratio (BR) of the resulting ethylene/hexene copolymer are shown in Table 1.

EXAMPLE 9

Polymerization was carried out in the same manner as in Example 8 except that the hydrogen concentration of the mixed gas of ethylene and hydrogen was changed to 0.153 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 1.

EXAMPLE 10

Polymerization was carried out in the same manner as in Example 8 except that the amount of the solid catalyst component (P) introduced was changed to 0.79 ml (0.00010 mmol in terms of zirconium), the hydrogen concentration of the mixed gas of ethylene and hydrogen was changed into 0.064 mol %, and the polymerization temperature was changed to 60° C. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 1.

EXAMPLE 11

Polymerization was carried out in the same manner as in Example 8 except that the amount of the solid catalyst component (P) introduced was changed to 1.19 ml (0.00015 mmol in terms of zirconium), the amount of 1-hexene was changed to 0 ml, and the hydrogen concentration of the mixed gas of ethylene and hydrogen was changed into 0.062 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 1.

EXAMPLE 12

Polymerization was carried out in the same manner as in Example 11 except that the hydrogen concentration of the mixed gas of ethylene and hydrogen was changed to 0.153 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 1.

TABLE 1

| | Yield (g) | Polymerization activity (kg/mmol-Zr) | Hexene content (mol %) | [η] (dl/g) | Mw | Mw/Mn | BR |
|---|---|---|---|---|---|---|---|
| Example 8 | 28.8 | 384 | 0.44 | 3.87 | 160000 | 18.2 | 52/48 |
| Example 9 | 35.7 | 476 | 0.28 | 1.77 | 76800 | 8.8 | 60/40 |
| Example 10 | 42.9 | 429 | 0.22 | 1.82 | 82900 | 7.7 | 65/35 |
| Example 11 | 67 | 446 | — | 2.07 | 103500 | 8.7 | 56/44 |
| Example 12 | 56 | 373 | — | 1.72 | 60900 | 8.8 | 54/46 |

EXAMPLE 13

Preparation of Solid Catalyst Component (Q)

35.0 ml toluene was introduced into a 300-ml glass flask flushed previously with nitrogen, and then charged under stirring with 5.11 ml slurry of the solid component (O) in toluene (0.415 g in terms of solids content) prepared above. Then, 20.0 ml toluene solution containing 0.0060 mmol compound (8) below and 0.0090 mmol compound (6) used in Example 6 above was added thereto dropwise over 15 minutes, and the mixture was reacted at room temperature for 1 hour. Thereafter, the supernatant was removed by decantation, and the remaining solids were washed 3 times with heptane, followed by adding 100 ml heptane, to prepare slurry of the solid catalyst component (Q) in heptane. A part of the resulting slurry of the solid catalyst component (Q) in heptane was collected to examine its concentration, indicating that the Zr concentration was 0.000120 mmol/ml, and the Al concentration was 0.0318 mmol/ml.

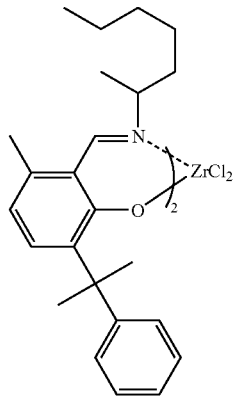

Compound (8)

[Polymerization]

500 ml heptane was introduced into an SUS autoclave having an internal volume of 1 liter purged sufficiently with nitrogen, and the liquid phase and gaseous phase were saturated with a mixed gas of ethylene/hydrogen (hydrogen concentration: 0.064 mol %). Thereafter, 3ml 1-hexene, 0.5 ml solution of triisobutyl aluminum (manufactured by Tosoh Finechem Corporation) in heptane (1.0 mmol/ml in terms of aluminum atom), and 0.63 ml solid catalyst component (Q) (0.000075 mmol in terms of zirconium atom) were added thereto, heated to 65° C. and subjected to polymerization for 3 hours while a mixed gas of ethylene/hydrogen (hydrogen concentration: 0.064 mol %) was supplied such that the total pressure became 8 kg/cm²-G. The polymerization was terminated by adding a small amount of methanol. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

EXAMPLE 14

Polymerization was carried out in the same manner as in Example 13 except that the hydrogen concentration of the mixed gas of ethylene and hydrogen was changed to 0.101 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

EXAMPLE 15

Polymerization was carried out in the same manner as in Example 13 except that the hydrogen concentration of the mixed gas of ethylene and hydrogen was changed to 0.153 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

EXAMPLE 16

Polymerization was carried out in the same manner as in Example 13 except that the amount of the solid catalyst component (Q) introduced was changed to 0.84 ml (0.00010 mmol in terms of zirconium), and the polymerization temperature was changed to 60° C. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

EXAMPLE 17

Polymerization was carried out in the same manner as in Example 13 except that the amount of the solid catalyst component (Q) introduced was changed to 1.26 ml (0.00015 mmol in terms of zirconium), and the amount of 1-hexene was changed to 0 ml. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

EXAMPLE 18

Polymerization was carried out in the same manner as in Example 16 except that the hydrogen concentration of the mixed gas of ethylene and hydrogen was changed to 0.153 mol %. The resulting polymer was washed with hexane and then dried under reduced pressure at 80° C. for 10 hours.

The yield, polymerization activity per 1 mmol zirconium, hexene content, [η], Mw, Mw/Mn, and BR of the resulting ethylene/hexene copolymer are shown in Table 2.

TABLE 2

| | Yield (g) | Polymerization activity (kg/mmol-Zr) | Hexene content (mol %) | [η] (dl/g) | Mw | Mw/Mn | BR |
|---|---|---|---|---|---|---|---|
| Example 13 | 44.7 | 597 | 0.24 | 3.04 | 151100 | 5 | 66/34 |
| Example 14 | 30.9 | 413 | 0.22 | 3.04 | 142300 | 13.4 | 62/38 |
| Example 15 | 46.2 | 616 | 0.22 | 2.36 | 93800 | 10.4 | 65/35 |
| Example 16 | 53.5 | 535 | 0.18 | 2.52 | 113100 | 4.1 | 64/36 |
| Example 17 | 75.3 | 502 | — | 2.87 | 134400 | 4.6 | 58/42 |
| Example 18 | 53 | 353 | — | 2.22 | 104800 | 9.9 | 64/36 |

Results of Evaluation of Physical Properties

The physical properties of the ethylene-based polymers synthesized in the Examples above are shown in Table 3.

TABLE 3

| | $MFR_{20}$ (g/10 min) | $MFR_{20}$ (g/10 min) | Density (kg/m³) | MT g | $\alpha^{1)}$ | Swell ratio | Ea (KJ/mol) | [η] (dl/g) | $\beta^{2)}$ | Mw/Mn |
|---|---|---|---|---|---|---|---|---|---|---|
| Example 9 | 0.37 | 66 | 960 | 9 | 5.53 | 1.6 | 26 | 1.77 | 1.98 | 8.8 |
| Example 10 | 0.52 | 75 | 962 | 9 | 4.59 | 1.7 | 26 | 1.82 | 1.91 | 7.7 |
| Example 11 | 0.29 | 29 | 965 | 13.5 | 6.32 | 1.6 | 25 | 2.07 | 2.46 | 8.7 |
| Example 12 | 2.09 | 120 | 966 | 4 | 2.13 | 1.4 | 24 | 1.72 | 1.65 | 8.8 |
| Example 13 | 0.03 | 5 | 952 | 32 | 22.02 | 1.7 | 24 | 3.04 | 3.49 | 5 |
| Example 14 | 0.03 | 4 | 950 | 30 | 22.02 | 1.7 | 25 | 3.04 | 3.58 | 13.4 |
| Example 15 | 0.26 | 18 | 953 | 10.5 | 6.71 | 1.6 | 26 | 2.36 | 2.71 | 10.4 |
| Example 16 | 0.25 | 15 | 953 | 11.5 | 6.86 | 1.7 | 25 | 2.52 | 2.81 | 4.1 |
| Example 17 | 0.13 | 9 | 957 | 14 | 9.83 | 1.7 | 26 | 2.87 | 3.14 | 4.6 |
| Example 18 | 0.59 | 23 | 960 | 6.5 | 4.28 | 1.8 | 23 | 2.22 | 2.57 | 9.9 |

$^{1)}\alpha: 3.2 * MFR_2^{-0.55}$,
$^{2)}\beta: 4.35 - 1.3 \log MFR_{20}$

As can be seen from Table 3, the parameters of the ethylene-based polymers obtained in the Examples are within the ranges defined in the claims.

The physical properties of conventionally known ethylene-based polymers in the Comparative Examples are shown in Tables 4 and 5. It is evident that with respect to the known resins in the Comparative Examples and Reference Examples, the relationship between $MFR_2$ and MT, and/or Ea which is 30 KJ/mol or more, is outside of the claims.

Comparative Example 1'

Ultzex UZ2510F (Brand Name) Manufactured by Mitsui Chemicals, Inc.

Comparative Example 2

Ultzex UZ2520F (Brand Name) Manufactured by Mitsui Chemicals, Inc.

Comparative Example 3

Hizex HZ8200B (Brand Name) Manufactured by Mitsui Chemicals, Inc.

Comparative Example 4

Evolue SP2520 (Brand Name) Manufactured by Mitsui Chemicals, Inc.

Comparative Example 5

Evolue SP2040 (Brand Name) Manufactured by Mitsui Chemicals, Inc.

Comparative Example 6

Hizex 6008B (Brand Name) Manufactured by Mitsui Chemicals, Inc.

Comparative Example 7

Mirason F9725 (Brand Name) Manufactured by Mitsui Chemicals, Inc.

Comparative Example 8

Mirason M11 (Brand Name) Manufactured by Mitsui Chemicals, Inc.

TABLE 4

|  | Brand name | $MFR_2$ (g/10 min) | $MFR_{20}$ (g/10 min) | MT (g) | $\alpha^{1)}$ | $[\eta]$ (dl/g) | $\beta^{2)}$ | Ea (KJ/mol) |
|---|---|---|---|---|---|---|---|---|
| Comparative Example 1' | UZ2510F | 1.32 | — | 1.8 | 2.75 | 1.83 | — | 27 |
| Comparative Example 2' | UZ2520F | 2.47 | — | 1.25 | 1.95 | 1.59 | — | 26 |
| Comparative Example 3' | HZ8200B | 0.03 | 5.3 | 20.4 | 22.02 | 3.54 | 3.4 | 33 |
| Comparative Example 4' | SP2520 | 1.83 | — | 0.85 | 2.3 | 1.73 | — | 25 |
| Comparative Example 5' | SP2040 | 3.8 | — | 0.5 | 1.54 | 1.51 | — | 25 |
| Comparative Example 6' | HZ6008B | 0.36 | 35 | 8 | 5.61 | 2.45 | 2.34 | 30 |
| Comparative Example 7' | F9725 | 1.14 | — | 8 | 2.98 | 1.17 | — | 42 |
| Comparative Example 8' | M11 | 7.91 | — | 3.6 | 1.03 | 1.1 | — | 46 |

$^{1)}\alpha: 3.2 * MFR_2^{-0.55}$,
$^{2)}\beta: 4.35 - 1.3 \log MFR_{20}$

Reference Example 1

Hizex HZ9200B (Brand Name) Manufactured by Mitsui Chemicals, Inc.

Reference Example 2

Hizex HZ5300B (Brand Name) Manufactured by Mitsui Chemicals, Inc.

Reference Example 3

Mirason MR102J (Brand Name) Manufactured by Mitsui Chemicals, Inc.

Reference Example 4

Mirason MRFF999 (Brand Name) Manufactured by Mitsui Chemicals, Inc.

TABLE 5

|  | Brand name | $MFR_{20}$ (g/10 min) | $[\eta]$ (dl/g) | $\beta^{1)}$ | Ea (KJ/mol)/ (KL/mol) |
|---|---|---|---|---|---|
| Reference Example 1 | HZ9200B | 2.11 | 4.2 | 3.92 | 35 |
| Reference Example 2 | HZ5300B | 48 | 2.4 | 2.16 | 32 |
| Reference Example 3 | MR102J | 17 | 1.71 | 2.75 | 50 |
| Reference Example 4 | MRF999 | 43 | 1.19 | 2.26 | 43 |

$^{1)}\beta: 4.35 - 1.3 \log MFR_{20}$

INDUSTRIAL APPLICABILITY

The ethylene-based polymer of the present invention is excellent in moldability to provide a molded product excellent in mechanical strength and outward appearance. The ethylene-based polymer of the present invention, when used in blow-molded products and in extrusion-molded products such as pipes and special shapes, gives excellent characteristics. By the olefin polymerization catalyst and the polymerization method according to the present invention, the ethylene-based polymer having the above-described excellent physical properties can be produced with high polymerization activity even in single-stage polymerization.

The invention claimed is:

1. A method for producing an ethylene-based polymer satisfying the following requirements (i), (ii), (iii) and (iv) simultaneously:
(i) melt flow rate [$MFR_2$ (g/10 min)] under a loading of 2.16 kg at 190° C. is in the range of 0.01 to 10, (ii) melt tension [MT (g)] and the above melt flow rate [$MFR_2$ (g/10 min)] satisfy the following relationship:

$$MT \geq 3.2 \times MFR_2^{-0.55}$$

(iii) an activation energy [Ea] of fluidization is less than 30 (KJ/mol), and (iv) swell ratio is 1.36 or more by copolymerizing ethylene with a C3 to C10 α-olefin, in the presence of a solid catalyst component carried on (C) a solid carrier:

(A1) a group 4 transition metal compound represented by the general formula [I] below, (A2) a group 4 transition metal compound represented by the general formula [II] below, and (B) at least one compound selected from the group consisting of:

(b-1) an organometallic compound, (b-2) an organoaluminum oxy compound, and (b-3) a compound reacting with the transition metal compound (A1) or (A2) to form an ion pair,

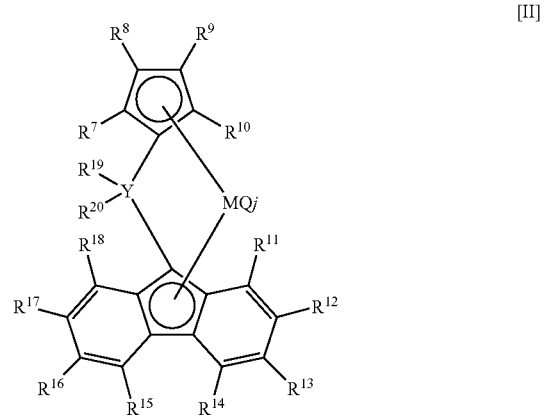

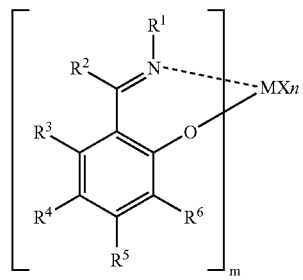

where M represents a transition metal atom in the group 4 in the periodic table, m represents an integer of 1 to 4, $R^1$ represents a branched or liner aliphatic hydrocarbon group or an optionally substituted alicyclic hydrocarbon group, $R^2$ to $R^6$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, two or more of which may be bound to one another to form a ring, and when m is 2, two of the groups represented by $R^2$ $R^6$ may be bound to each other provided that $R^1$'s shall not be bound to each other, and n is a number satisfying the valence of M, X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by X's may be the same or different, and a plurality of groups represented by X's may be bound to one another to form a ring, where $R^7$ to $R^{20}$ are selected from hydrogen, a hydrocarbon group and a silicon-containing group, and may be the same or different, adjacent substituents $R^7$ to $R^{20}$ may be bound to each other to form a ring, M is a group 4 transition metal atom, Y is a group 14 atom, Q may be selected in the same or different combination from a halogen, a hydrocarbon group, an anion ligand, and a neutral ligand capable of coordination with a lone pair of electrons, j is an integer of 1 to 4, at least one of $R^{19}$ and $R^{20}$ is an unsubstituted aryl group or a substituted aryl group, and when both $R^{19}$ an $R^{20}$ are either unsubstituted aryl groups or substituted aryl groups, $R^{19}$ and $R^{20}$ may be the same or different.

2. A single-layer or multi-layer blow-molded product comprising the ethylene-based polymer obtained by the method according to claim 1.

3. The single-layer or multi-layer blow-molded product according to claim 2, wherein the molded product is an oil drum, a 1000-L container, a gasoline tank, an industrial chemical can or a bottle container.

4. A single-layer or multi-layer pipe or pipe joint comprising the ethylene-based polymer obtained by the method according to claim 1.

5. An ethylene-based polymer which is a copolymer obtained from ethylene and a C3 to C10 α-olefin and satisfies the following requirements (i), (ii), (iii) and (iv) simultaneously:

(i) melt flow rate [$MFR_2$ (g/10 min)] under a loading of 2.16 kg at 190° C. is in the range of 0.01 to 10, (ii) melt tension [MT (g)] and the above melt flow rate [$MFR_2$ (g/10 min)] satisfy the following relationship:

$$MT \geq 3.2 \times MFR_2^{-0.55}$$

(iii) an activation energy [Ea] of fluidization is less than 30 (KJ/mol), and (iv) swell ratio is 1.36 or more, wherein said ethylene-based polymer is obtained by copolymerizing ethylene with a C3 to C10 α-olefin, in the presence of a solid catalyst component carried on (C) a solid carrier:

(A1) a group 4 transition metal compound represented by the general formula [I] below, (A2) a group 4 transition metal compound represented by the general formula [II] below, and
(B) at least one compound selected from:
(b-1) an organometallic compound,
(b-2) an organoaluminum oxy compound, and
(b-3) a compound reacting with the transition metal compound (A1) or (A2) to form an ion pair,

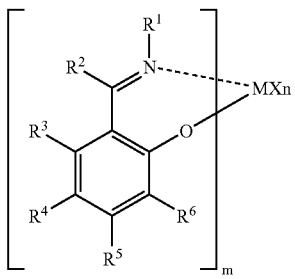

where M represents a transition metal atom in the group 4 in the periodic table, m represents an integer of 1 to 4, $R^1$ represents a branched or linear aliphatic hydrocarbon group or an optionally substituted alicyclic hydrocarbon group, $R^2$ to $R^6$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, two or more of which may be bound to one another to form a ring, and when m is 2, two of the groups represented by $R^2$ to $R^6$ be bound to each other provided that $R^1$'s shall not be bound to each other, and n is a number satisfying the valence of M, X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by X's may be the same or different, and a plurality of groups represented by X's may be bound to one another to form a ring,

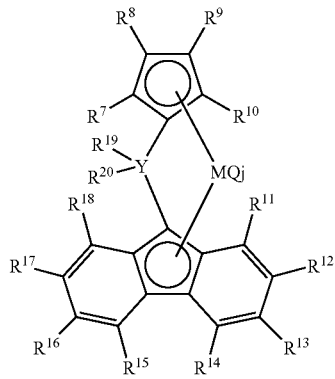

where $R^7$ $R^{20}$ are selected from hydrogen, a hydrocarbon group and a silicon-containing group, and may be the same or different, adjacent substituents $R^7$ $R^{20}$ be bound to each other to form a ring, M is a group 4 transition metal atom, Y is a group 14 atom, Q may be selected in the same or different combination from a halogen, a hydrocarbon group, an anion ligand, and a neutral ligand capable of coordination with a lone pair of electrons, j is an integer of 1 to 4, at least one of $R^{19}$ and $R^{20}$ is an unsubstituted aryl group or a substituted aryl group, and when both $R^{19}$ an $R^{20}$ are either unsubstituted aryl groups or substituted aryl groups, $R^{19}$ and $R^{20}$ may be the same or different.

* * * * *